US012724558B2

(12) United States Patent
Hatae

(10) Patent No.: US 12,724,558 B2
(45) Date of Patent: Sep. 1, 2026

(54) MANAGEMENT SYSTEM AND MANAGEMENT METHOD FOR SUPPORTING STORAGE MIGRATION

(71) Applicant: Hitachi Vantara, Ltd., Yokohama (JP)

(72) Inventor: Maki Hatae, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 43 days.

(21) Appl. No.: 18/811,949

(22) Filed: Aug. 22, 2024

(65) Prior Publication Data

US 2025/0138743 A1 May 1, 2025

(30) Foreign Application Priority Data

Nov. 1, 2023 (JP) ................................ 2023-187566

(51) Int. Cl.
*G06F 3/06* (2006.01)

(52) U.S. Cl.
CPC .......... *G06F 3/0647* (2013.01); *G06F 3/0604* (2013.01); *G06F 3/067* (2013.01)

(58) Field of Classification Search
CPC ....... G06F 3/0647; G06F 3/0604; G06F 3/067
See application file for complete search history.

(56) References Cited

U.S. PATENT DOCUMENTS 11,870,647 B1 * 1/2024 Zhang ................. H04L 41/5051
2012/0239739 A1 * 9/2012 Manglik .................. G06F 8/61 709/203
2014/0278807 A1 * 9/2014 Bohacek ........... G06Q 30/0206 705/7.35
2017/0344618 A1 * 11/2017 Horowitz ................ G06F 16/27
2022/0019553 A1 * 1/2022 Dixith .................. G06F 16/119
2022/0066823 A1 3/2022 Terayama
2022/0173966 A1 * 6/2022 Hill ........................ H04L 67/34
2024/0103919 A1 * 3/2024 Karr ....................... G06F 16/00
2024/0112106 A1 * 4/2024 Garrett ............ G06Q 10/06313

FOREIGN PATENT DOCUMENTS

JP 2022-038919 A 3/2022
JP 2022-129957 A 9/2022

* cited by examiner

*Primary Examiner* — Benjamin R Bruckart
(74) *Attorney, Agent, or Firm* — MATTINGLY & MALUR, PC

(57) ABSTRACT

To an on-premises configuration policy, a cloud configuration policy is mapped in a one-to-one relationship in advance. The on-premises configuration policy is a configuration policy including a plurality of parameter items each of which is specified with an on-premises parameter. The cloud configuration policy is a configuration policy including a plurality of parameter items each of which is specified with a cloud parameter value. A management system acquires configuration information representing the configuration of an on-premises storage that is a migration source, determines an on-premises configuration policy matching the configuration information, identifies a cloud configuration policy corresponding to the on-premises configuration policy, and provides a user with a configuration plan in accordance with the identified cloud configuration policy.

10 Claims, 15 Drawing Sheets

FIG. 3A

| PARAMETER ITEM | O1 | O2 | O3 | O4 |
| --- | --- | --- | --- | --- |
| ENCRYPTION | YES | NO | YES | YES |
| COMPRESSION | NO | NO | NO | YES |
| DEDUPLICATION | NO | YES | YES | NO |
| REDUNDANCY | 0 | 6 | 5 | 1 |
| REPLICATION | LOCAL REPLICATION | REMOTE REPLICATION (2DC) | REMOTE REPLICATION (3DC) | REMOTE REPLICATION (3DC) |
| DRIVE | SSD | SSD | SSD | HDD |
| ENCRYPTION key MANAGEMENT METHOD | USER HIM/HERSELF MANAGES KEY USING EXTERNAL DEVICE | NO | USER HIM/HERSELF DOES NOT MANAGE KEY | USER HIM/HERSELF MANAGES KEY ON DEVICE |
| CAPACITY | 50GB | 10KGB | 1KGB | 100KGB |
| DATA TRANSFER APPLICATION | 10Gbps | 25Gbps | 20Gbps | 30Gbps |
| DATA TRANSFER REPLICATION | 25Gbps | 10Gbps (TWO NETWORKS) | 60Gbps (WHEN NETWORK BANDWIDTH IS REQUIRED IN THREE OR MORE NETWORKS) | 30Gbps (THREE OR MORE NETWORKS) |
| | C1 | C2 | C3 | C4 |

| | O1 | O2 | O3 | O4 |
|---|---|---|---|---|
| PARAMETER ITEM | C1 | C2 | C3 | C4 |
| ENCRYPTION | YES | NO | YES | YES |
| COMPRESSION | NO | NO | NO | YES |
| DEDUPLICATION | NO | YES | YES | NO |
| REDUNDANCY | PROVISIONED IOPS SSD | DOUBLE REDUNDANT CONFIGURATION OF VSSB-C | SINGLE REDUNDANT CONFIGURATION OF VSSB-C | MIRRORING FUNCTION, TWO OR MORE EBS |
| REPLICATION | SINGLE REGION (SINGLE AZ OR MULTI-AZ) | MULTI-REGION (TWO REGIONS) | MULTI-REGION (THREE OR MORE REGIONS) | MULTI-REGION (THREE OR MORE REGIONS) |
| DRIVE (EBS TYPE) | PROVISIONED IOPS SSD | GENERAL SSD OR PROVISIONED IOPS SSD | GENERAL SSD OR PROVISIONED IOPS SSD | THROUGHPUT-OPTIMIZED HDD VOLUME |
| ENCRYPTION key MANAGEMENT METHOD | EXTERNAL KEY STORE MANAGEMENT | NO | AWS KMS MANAGEMENT | AWS CloudHSM KEY STORE MANAGEMENT |
| CAPACITY | 50GB | 10KGB | 1KGB | 100KGB |
| DATA TRANSFER APPLICATION | EC2 INSTANCE TYPE SATISFYING 10Gbps NETWORK BANDWIDTH | EC2 INSTANCE TYPE SATISFYING 25Gbps NETWORK BANDWIDTH | EC2 INSTANCE TYPE SATISFYING 20Gbps NETWORK BANDWIDTH | EC2 INSTANCE TYPE SATISFYING 30Gbps NETWORK BANDWIDTH |
| DATA TRANSFER REPLICATION | NONE | VPC Peering (SINGLE VPC CONNECTION) | VPC Peering MULTIPLE CONNECTIONS | AWS Transit Gateway |

| PARAMETER ITEM | C1 | C2 | C3 | C4 |
|---|---|---|---|---|
| ENCRYPTION | YES | NO | YES | YES |
| COMPRESSION | NO | NO | NO | YES |
| DEDUPLICATION | NO | YES | YES | NO |
| REDUNDANCY | PROVISIONED IOPS SSD | DOUBLE REDUNDANT CONFIGURATION OF VSSB-C | SINGLE REDUNDANT CONFIGURATION OF VSSB-C | PROVISIONED IOPS SSD |
| REPLICATION | MULTI-REGION (TWO REGIONS) | SINGLE REGION (SINGLE AZ OR MULTI-AZ) | MULTI-REGION (THREE OR MORE REGIONS) | MULTI-REGION (THREE OR MORE REGIONS) |
| DRIVE (EBS TYPE) | PROVISIONED IOPS SSD | GENERAL SSD OR PROVISIONED IOPS SSD | GENERAL SSD OR Provisioned IOPS SSD | PROVISIONED IOPS SSD |
| ENCRYPTION key MANAGEMENT METHOD | EXTERNAL KEY STORE MANAGEMENT | NO | AWS KMS MANAGEMENT | AWS CloudHSM KEY STORE MANAGEMENT |
| CAPACITY | 50GB | 10KGB | 1KGB | 100KGB |
| DATA TRANSFER APPLICATION | EC2 INSTANCE TYPE SATISFYING 10Gbps NETWORK BANDWIDTH | EC2 INSTANCE TYPE SATISFYING 25Gbps NETWORK BANDWIDTH | EC2 INSTANCE TYPE SATISFYING 20Gbps NETWORK BANDWIDTH | EC2 INSTANCE TYPE SATISFYING 30Gbps NETWORK BANDWIDTH |
| DATA TRANSFER REPLICATION | VPC Peering (SINGLE VPC CONNECTION) | NONE | VPC Peering MULTIPLE CONNECTIONS | AWS Transit Gateway |

MANAGEMENT SYSTEM AND MANAGEMENT METHOD FOR SUPPORTING STORAGE MIGRATION

CROSS-REFERENCE TO RELATED APPLICATION

The present application claims priority from Japanese application JP2023-187566, filed on Nov. 1, 2023, the content of which is hereby incorporated by reference into this application.

BACKGROUND OF THE INVENTION

1. Field of the Invention

The present invention relates to storage migration from an on-premises environment to a cloud environment.

2. Description of the Related Art

In relation to such storage migration from an on-premises environment to a cloud environment, techniques disclosed in JP 2022-129957 A and JP 2022-038919 A are known, for example.

SUMMARY OF THE INVENTION

To construct a storage in a cloud environment, users are asked to provide various requirements such as the type of business, a scale, or availability, and the cloud environment is constructed on the basis of such requirements. However, it is difficult for the users themselves to determine how much these requirements are needed in the storage the users expect. Neither such a problem nor any solution to the problem are disclosed or implied in JP 2022-129957 A or JP 2022-038919 A.

To an on-premises configuration policy, a cloud configuration policy is mapped in a one-to-one relationship in advance. The on-premises configuration policy is a configuration policy including a plurality of parameter items each of which is specified with an on-premises parameter. The cloud configuration policy is a configuration policy including a plurality of parameter items each of which is specified with a cloud parameter value. A management system acquires configuration information representing the configuration of an on-premises storage that is a migration source, determines an on-premises configuration policy matching the configuration information, and identifies a cloud configuration policy corresponding to the on-premises configuration policy. The management system then provides a user with a cloud configuration plan that is in accordance with the identified cloud configuration policy.

According to the present invention, users can receive an appropriate configuration plan for a cloud that is a migration target of an on-premises configuration, without any need for grasping the details of various parameter items of either the on-premises configuration or the cloud configuration.

BRIEF DESCRIPTION OF THE DRAWINGS

FIG. 3A illustrates a configuration of an on-premises policy management table;

FIG. 3B illustrates a configuration of a cloud policy management table;

FIG. 12 illustrates an example of how parameter values related to a cloud configuration are automatically changed.

DESCRIPTION OF THE PREFERRED EMBODIMENTS

Figure 1:
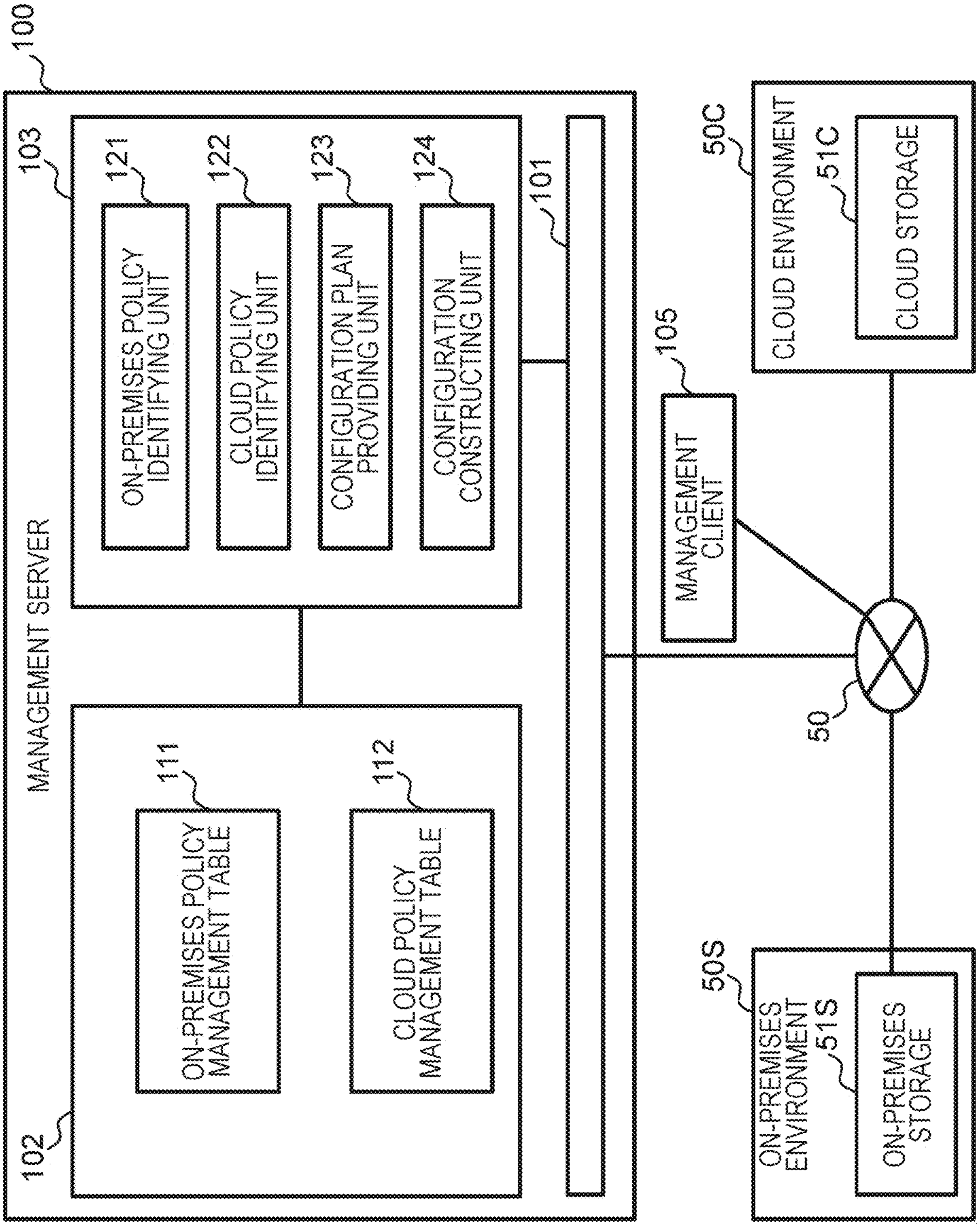
FIG. 1 illustrates a configuration of the entire system according to an embodiment.

In the description hereunder, an "interface device" may be one or more interface devices. The one or more interface devices may include at least one of the following:

- One or more input/output (I/O) interface devices. An input/output (I/O) interface device is an interface device to at least one of an I/O device and a remote computer for displaying. The I/O interface device for the computer for displaying may be a communication interface device. At least one I/O device may be any user interface device that is one of an input device such as a keyboard or a pointing device and an output device such as a display device.
- One or more communication interface devices. The one or more communication interface devices may be one or more communication interface devices of the same type (e.g., one or more network interface cards (NICs)) or communication interface devices of two or more different types (e.g., NICs and host bus adapters (HBAs)).

In the description hereunder, a "memory" is one or more memory devices that are examples of one or more storage devices, and a typical example of the memory is a main storage device. The one or more memory devices in the memory may be a volatile memory device or a nonvolatile memory device.

In the description hereunder, a "persistent storage device" include one or more persistent storage devices that are examples of one or more storage devices. The persistent storage device may typically be a nonvolatile storage device (such as an auxiliary storage device). Specific examples of the persistent storage device include a hard disk drive (HDD), a solid state drive (SSD), a non-volatile memory express (NVME) drive, or a storage class memory (SCM).

In the description hereunder, a "storage device" may be at least a memory, among a memory and a persistent storage device.

In the description hereunder, a "processor" may include one or more processor devices. At least one of the processor devices may be, typically, a microprocessor device such as a central processing unit (CPU), but may also be a processor device of another type, e.g., a graphics processing unit (GPU). At least one of the processor devices may be a single-core processor or a multi-core processor. At least one of the processor devices may be a processor core. At least one of the processor devices may be a processor device in a broad sense, e.g., circuitry that is a collection of gate arrays executing a part or the whole of processing described in a hardware description language (such as a field-programmable gate array (FPGA), a complex programmable logic device (CPLD), or an application-specific integrated circuit (ASIC)).

Furthermore, in the description hereunder, an expression "yyy unit" may be used in the description of a function, but a function may be implemented by causing a processor to execute one or more computer programs, by using one or more hardware circuits (such as FPGAs or ASICs), or by using a combination of these two. In a configuration in which a function is implemented by causing a processor to execute a program, predetermined processing is performed using a storage device and/or an interface device, as appropriate. Therefore, the function may form at least a part of the processor. Although some processing may be described using a function as the subject of a sentence, the processing may be performed by a processor or a device including the processor. A program may be installed from a program source. A program source may be a storage medium (such as a non-transitory storage medium) that is readable by a program distribution computer or a computer, for example. The description of each function is exemplary, and a plurality of functions may be integrated into one function, or one function may be distributed to a plurality of functions.

Furthermore, hereinafter, when elements of the same type are to be described without distinguishing one another, the common part of their reference numerals is sometimes used in the description. When elements of the same type are to be distinguished from one another, reference numerals corresponding to the respective elements are sometimes used.

Furthermore, in the description hereunder, a "management system" may include one or more computers. Specifically, in a case where the computer has a display device, and the computer displays information on the display device provided to the computer, for example, the computer may constitute the management system. In addition, for example, in a case where a first computer (e.g., a server) transmits information to be displayed, to a second computer (e.g., a computer for displaying (such as a client)) in a remote location, and the computer for displaying displays the information (in a case where the first computer causes the second computer to display information), at least the first computer, among the first computer and the second computer, may constitute the management system.

FIG. 1 illustrates a configuration of the entire system according to an embodiment.

In this system, the data in an on-premises storage 51S in an on-premises environment 50S is to be migrated to a cloud storage 51C in a cloud environment 50C.

In this embodiment, the on-premises storage 51S is a storage system including one or more physical servers, but the configuration of the on-premises storage 51S is not limited to such a storage system. The on-premises environment 50S is an environment of the on-premises storage 51S, and may be a building of a company in one or more locations, for example.

The cloud storage 51C is a software-defined storage (SDS) in this embodiment, but without limitation to an SDS. The cloud environment 50C is a computer system providing the foundation for the cloud storage 51C, and may include a plurality of physical servers. In this embodiment, a platform such as Amazon Web Services (AWS) is used as an example of the cloud environment 50C, but another type of cloud environment may be used. (Note that Amazon Web Services and AWS are registered trademarks.)

A management server 100 is communicably connected to the on-premises storage 51S, the cloud environment 50C, and a management client 105 via a communication network 50. The communication network 50 may be any communication network such as the Internet, a wide area network (WAN), or a local area network (LAN).

The management system includes at least the management server 100, among the management server 100 and the management client 105. The management server 100 may be a physical computer system (e.g., one or more physical computers) or a logical computer system (e.g., a system as a cloud computing service) that is based on a physical computer system (e.g., the cloud environment 50C or another cloud environment). The management client 105 may be an information processing terminal (e.g., a personal computer or a smartphone) serving as an input/output console including an input device and a display device. The management client 105 inputs and outputs data to and from the management server 100, in accordance with an operation made by a user.

The management server 100 includes an interface device 101, a storage device 102, and a processor 103 connected to the interface device 101 and the storage device 102.

Communication is performed via the interface device 101. For example, the interface device 101 communicates with the on-premises storage 51S, the management client 105, and the cloud environment 50C via the communication network 50.

The storage device 102 stores therein data and programs. As examples of the data, an on-premises policy management table 111 and a cloud policy management table 112 are stored. The on-premises policy management table 111 represents a plurality of on-premises configuration policies. Each of the plurality of on-premises configuration policies is a configuration policy including a plurality of parameter items each of which is specified with an on-premises parameter value. The cloud policy management table 112 represents a plurality of cloud configuration policies. Each of the plurality of cloud configuration policies is a configuration policy including the plurality of parameter items each of which is specified with a cloud parameter value. These tables 111 and 112 will be described later in detail.

The processor 103 executes a computer program in the storage device 102 to implement functions such as an on-premises policy identifying unit 121, a cloud policy identifying unit 122, a configuration plan providing unit 123, and a configuration constructing unit 124. These functions 121 to 124 will be described later in detail.

Figure 2:
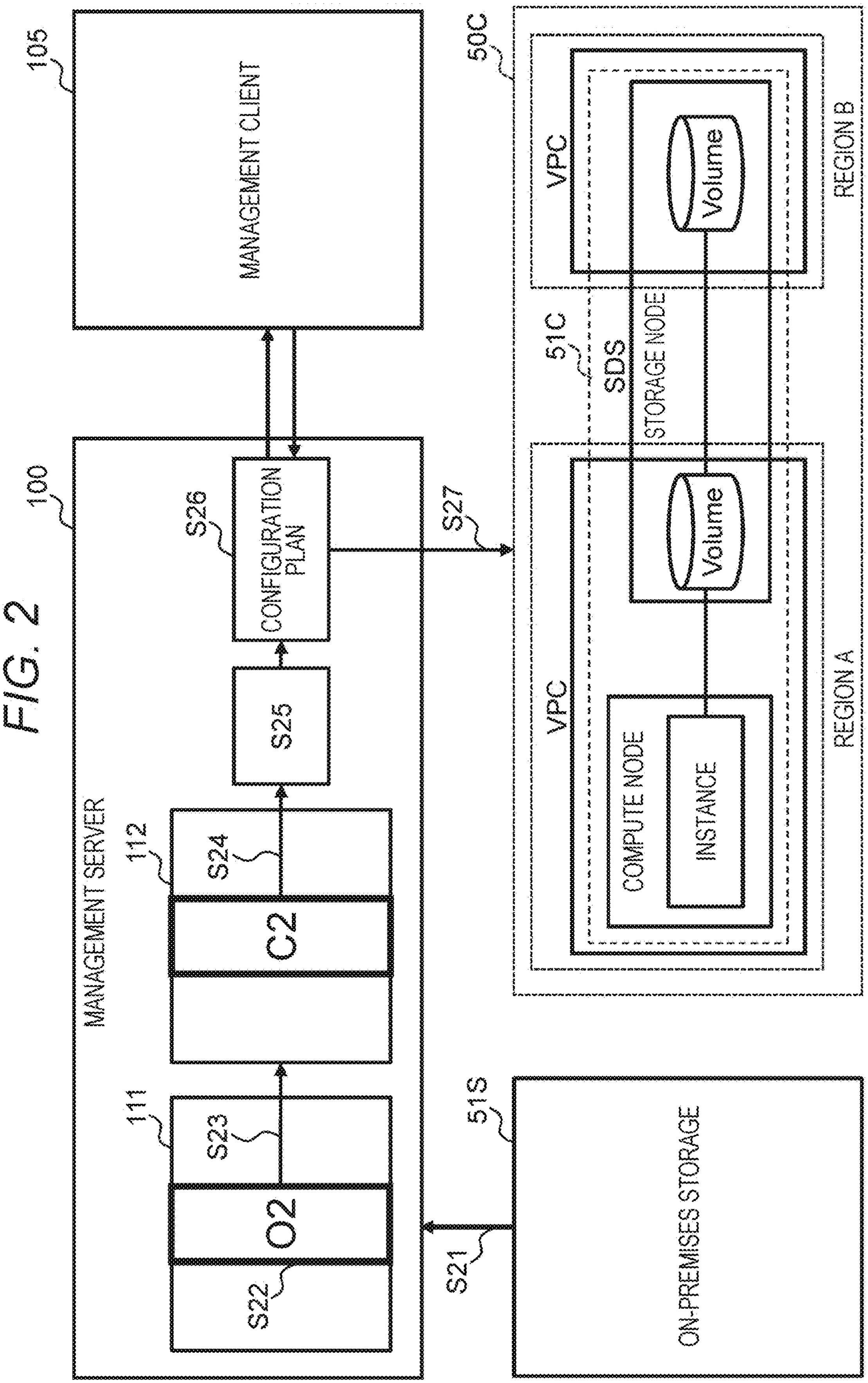
FIG. 2 schematically illustrates the sequence of processing performed in the embodiment.

FIG. 2 schematically illustrates the sequence of processing performed in the embodiment.

The on-premises policy identifying unit 121 acquires on-premises information including configuration information representing an on-premises configuration that is the configuration of the on-premises storage 51S, from the on-premises storage 51S (S21). The on-premises information may also be acquired from another system, instead of the on-premises storage 51S.

The on-premises policy identifying unit 121 then identifies the on-premises configuration policy corresponding to the on-premises configuration represented by the acquired on-premises information (on-premises configuration policy "O2", in this example), from the on-premises policy management table 111 (S22).

To each of the on-premises configuration policies, a cloud configuration policy is mapped in a one-to-one relationship in advance. The cloud policy identifying unit 122 then identifies a cloud configuration policy "C2" corresponding to the identified on-premises configuration policy "O2", from the cloud policy management table 112 (S23).

The configuration plan providing unit 123 determines a cloud configuration, which is a configuration of a cloud storage, that is in accordance with the identified cloud configuration policy "C2" (S24).

When there are a plurality of possible patterns for allocating on-premises data to cloud pools (pools in the cloud storage 51C), the configuration plan providing unit 123 performs data allocation determining processing (FIG. 6) (S25). In this processing, the configuration plan providing unit 123 narrows down one from patterns in which a plurality of on-premises pools (pools in the on-premises storage 51S) are allocated to one or more cloud pools that are migration targets. A "pool" herein is an example of a logical store, may be a target storage data stored in a volume is to be stored, and may include one or more volumes. A "volume" may also be an example of a logical store, and is a logical volume.

The configuration plan providing unit 123 provides a configuration plan including a plan for the cloud configuration determined in S24 to the user (S26). The "providing a configuration plan" may mean causing the management server 100 to display the configuration plan on the display device of the management client 105. Specifically, "providing a configuration plan" may be causing the management client 105 to transmit information for displaying the configuration plan to the management client 105.

In a case where an approval for the configuration plan is received from the user (management client 105) after the user has made some changes or no changes in the provided configuration plan, the configuration constructing unit 124 generates a construction instruction for constructing a cloud storage 51C having a cloud configuration that is in accordance with the configuration plan, on the basis of the approved configuration plan, and outputs the constructing instruction to the computer system configured to construct the cloud storage 51C (S27). The computer system may be the cloud environment 50C or a management system of the cloud environment 50C. Furthermore, the constructing instruction may be given using a template (in the example herein, an AWS CloudFormation (CF) template) including setting of parameter values required for constructing the cloud storage 51C, to the computer system.

In the example illustrated in FIG. 2, a cloud storage (SDS) 51C having a configuration for remote replication is constructed in the cloud environment 50C. In a remote replication configuration, volumes are allocated across different regions A and B. A Virtual Private Cloud (VPC) may be an example of an availability zone (AZ). The "region" herein a location where a physical server serving as a foundation of the cloud storage 51C is in operation, and may be a logical data center. An "AZ" is an independent group of resources within the region, and may be a range of resources, such as a room or a rack, into which the resources are partitioned. Specifically, for example, an "AZ" may be a group of data centers including one or more data centers, and a "region" may be a geographical area including a plurality of data center groups bundled as an AZ. The cloud storage 51C includes a compute node and a storage node. The compute node may include an instance, one example of which is Amazon Elastic Compute Cloud (Amazon EC2). The storage node may have a volume one example of which is an Amazon Elastic Block Store (Amazon EBS).

FIG. 3A illustrates a configuration of the on-premises policy management table 111. FIG. 3B illustrates a configuration of the cloud policy management table 112.

Each column in the on-premises policy management table 111 (hereinafter, an on-premises column) represents an on-premises configuration policy, and each column of the cloud policy management table 112 (hereinafter, a cloud column) represents a cloud configuration policy. As illustrated in FIGS. 3A and 3B, one on-premises column is mapped to one cloud column in a one-to-one relationship, in advance. In other words, in this embodiment, one on-premises configuration policy and one cloud configuration policy are mapped with each other in a one-to-one relationship, in advance. "O1" to "O4" in FIG. 3A are column IDs of the respective on-premises columns. "C1" to "C4" in FIG. 3B are column IDs of the respective cloud columns.

The on-premises configuration policy and the cloud configuration policy have a plurality of common parameter items related thereto. Specifically, for example, as a plurality of parameter items, both the on-premises configuration policy and the cloud configuration policy have <encryption>, <compression>, <deduplication>, <redundancy>, <replication>, <drive>, <encryption key management method>, <capacity>, <data transfer application>, and <data transfer replication>. Note that "xxx" in a parameter item <xxx> is a label given to the parameter item, and in this embodiment, the same label is given to the corresponding parameter items of the on-premises configuration policy and of the cloud configuration policy, for the ease of description. It is also possible for the parameter items of the on-premises configuration policy and of the cloud configuration policy to have different labels, as long as the on-premises configuration policy and the cloud configuration policy have the common parameter items (the parameter items are one-to-one correspondence). The parameter items are as follows.

<Encryption> relates to encryption of data stored in a pool (or a volume). The parameter values include "Yes" (data is encrypted) and "No" (data is not encrypted), but alternatively or additionally, a value representing an encryption scheme (e.g., an encryption algorithm) may be included in the parameter value.

<Compression> relates to compression of data stored in a pool (or a volume). The parameter values include "Yes" (data is compressed) and "No" (data is not compressed), but alternatively or additionally, a value representing a compression scheme (e.g., a compression algorithm) may be included in the parameter value.

<Deduplication> relates to deduplication of data stored in a pool (or a volume). The parameter values include "Yes" (to be deduplicated) and "No" (not to be deduplicated), but alternatively or additionally, a value representing a deduplication scheme may be included in the parameter value.

<Redundancy> relates to redundancy of the data stored in a pool (or a volume). For an on-premises configuration policy, the parameter value in <redundancy> may take a value representing a RAID level. For a cloud configuration policy, a parameter value in <redundancy> may include a value representing a possible redundant configuration in the cloud environment 50C.

<Replication> relates to a replication configuration between pools (or volumes). For an on-premises configuration policy, the parameter value of <replication> may take: "local replication" meaning replication between pools (or volumes) on the same physical server (or in the same region); or "remote replication" meaning replication between pools (or volumes) across different physical servers (or across different regions). The parameter value "local replication" may include a value indicating a copy type such as full copy or differential copy. The parameter value "remote replication" may include a value representing the number of data centers (DCs) that are regions. For a cloud configuration policy, the parameter value of <replication> may take: "single region" meaning replication within one region; or "multi-region" meaning replication across different regions. The parameter value "single region" may include "single AZ" meaning replication within one AZ, or "multi-AZ" meaning replication across different AZes. The parameter value "multi-region" may include a value representing the number of regions.

<Drive> relates to a type of a persistent storage device (an example of a physical store) providing the foundation for a pool (or a volume). For both of an on-premises configuration policy and a cloud configuration policy, the parameter value of <drive> takes a value representing a usable type of persistent storage device.

<Encryption key management method> becomes valid when <encryption> is set to "Yes", and relates to a method for managing the encryption key.

<Capacity> relates to a storage capacity. The parameter value of <capacity> may include a value indicating an upper bound of the total storage capacity of the on-premises storage 51S or the cloud storage 51C.

<Data transfer application> relates to a connection between an application (an example of an input/output source of data) and a pool (or a volume). In the cloud environment 50C, the application may be an instance. The parameter value of <data transfer application> may include a numerical value representing a network bandwidth or a value representing an instance type.

<Data transfer replication> relates to a connection between pools (or volumes). For an on-premises configuration policy, the parameter value of <data transfer replication> may include a numerical value representing a network bandwidth or a value representing details of a connection between pools (or volumes). For a cloud configuration policy, the parameter value of <data transfer replication> may include a value representing a connection usable in the cloud environment 50C.

Both of the on-premises configuration policies and the cloud configuration policies include parameter values for the parameter items described above.

Note that the on-premises configuration policy and the cloud configuration policy corresponding thereto do not need to be given a one-to-one correspondence of the parameter values in all the parameter items, in advance. For the cloud configuration policy "C1", for example, it is yet to be determined which one of single AZ and multi-AZ the parameter value "single region (single AZ or multi-AZ)" corresponding to <replication> will take. Such parameter values having been not uniquely determined in advance are determined by the configuration plan providing unit 123 or the user, after the cloud configuration policy is identified. For example, parameter values related to the pool allocation are determined during data allocation determining processing performed by the configuration plan providing unit 123. In addition, for the parameter item <encryption key management method> in any one of the cloud configuration policies, a default parameter value may be set in advance, and the user may be allowed to change the parameter value when the user provided with the configuration plan makes changes.

Furthermore, the parameter items related to the configuration policy are not limited to those illustrated in FIGS. 3A and 3B. For example, instead of or in addition to some of the parameter items illustrated in FIGS. 3A and 3B, parameter items such as "storage use case" and "data life cycle" may be used, as options, for example. With the parameter value of the "storage use case", the range of the parameter values for <drive> in the cloud configuration policy may be narrowed down. With the parameter value of the "data life cycle", the parameter value of <drive> in the cloud configuration policy may be set variable so as to follow temporal changes in the use of data over time.

Figure 4:
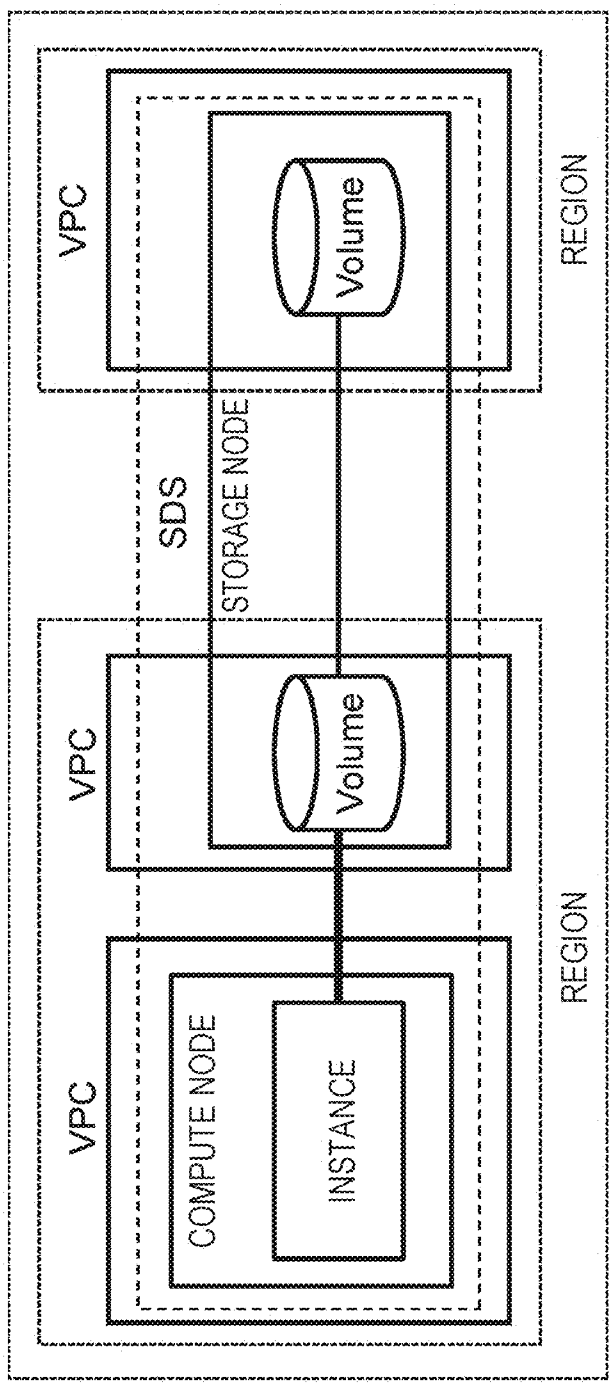
FIG. 4 illustrates an example of a replication configuration in a cloud environment.
Figure 5:
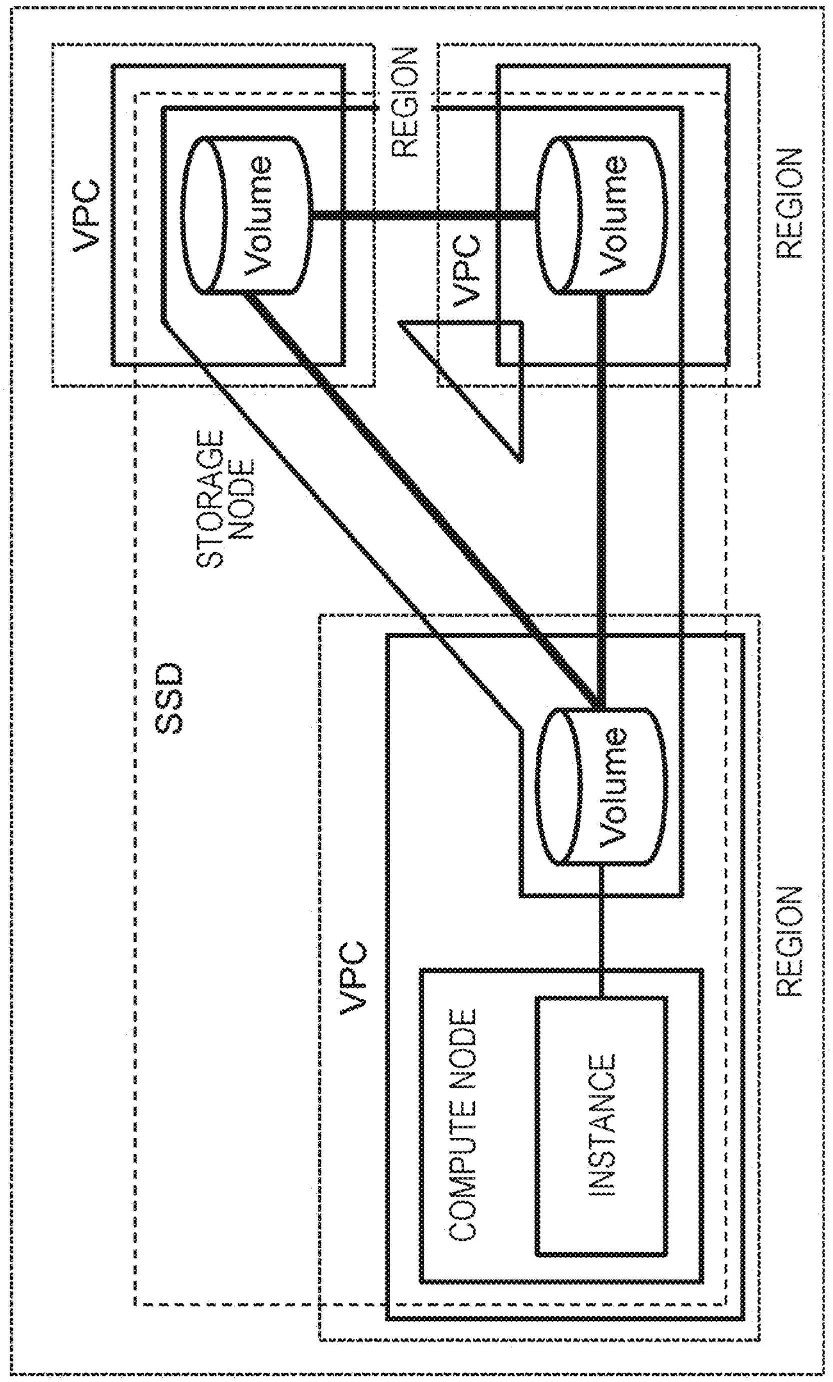
FIG. 5 illustrates an example of the replication configuration in the cloud environment.

FIGS. 4 and 5 illustrate examples of a replication configuration in the cloud environment 50C. In the example illustrated in FIG. 4, the region A has a multi-AZ (a plurality of VPCs), unlike the example illustrated in FIG. 2. In the example illustrated in FIG. 5, three volumes are allocated across three respective regions, and three volume pairs are configured for respective three region pairs.

Figure 6:
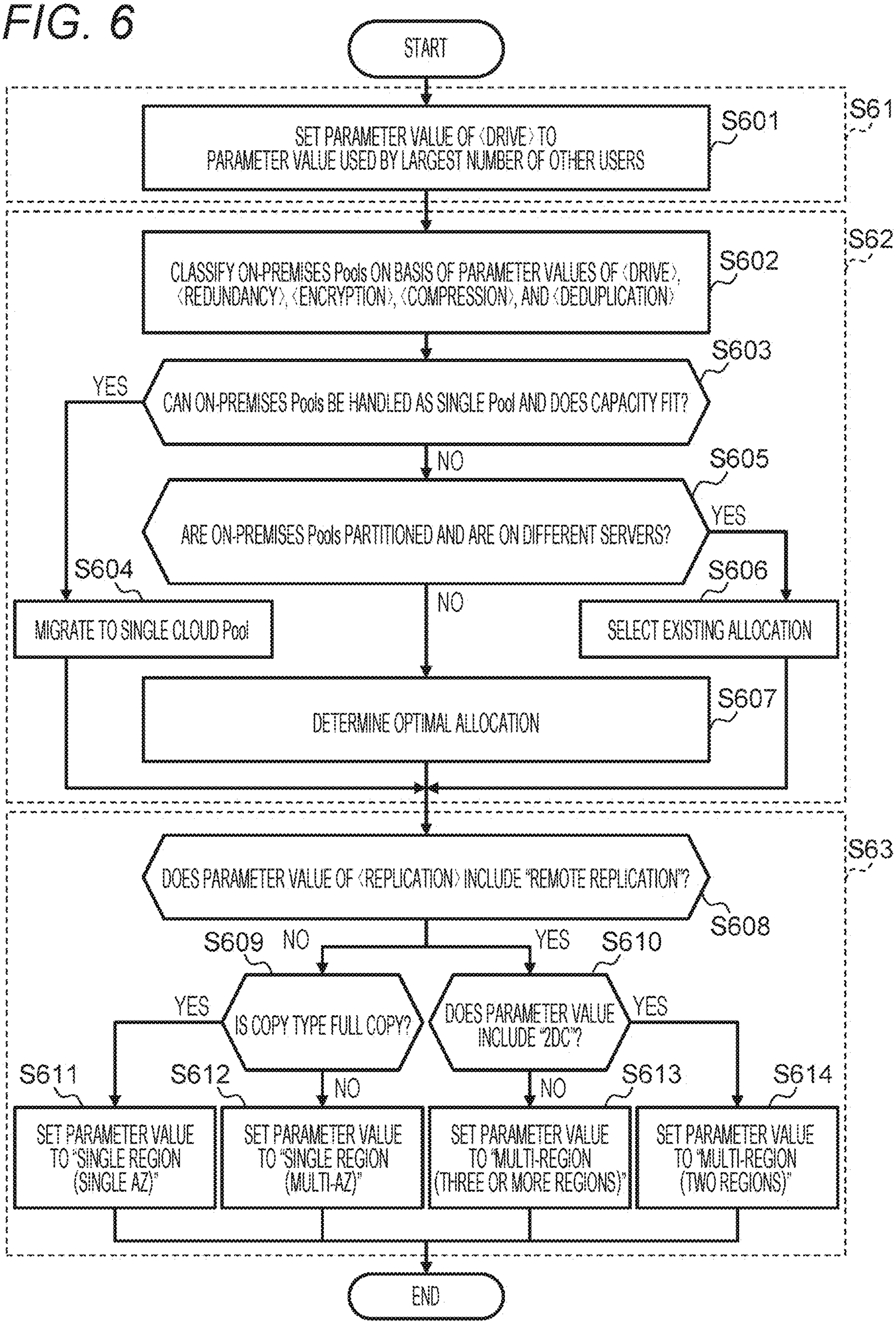
FIG. 6 illustrates the sequence of data allocation determining processing.

FIG. 6 illustrates the sequence of the data allocation determining processing (S25 in FIG. 2).

The data allocation determining processing is processing of narrowing down one from a plurality of possible patterns for allocating the plurality of on-premises cloud pools to the one or more cloud pools, and may be typically performed when there are a plurality of alternatives for data allocation to the cloud pools. The data allocation determining processing is roughly divided into selecting a parameter value for <drive> (S61), determining a pool allocation (S62), and determining an AZ and/or a region (S63).

S61 includes S601. In S601, the configuration plan providing unit 123 selects, as a parameter value of <drive> for the cloud configuration policy identified in S24 of FIG. 2 (hereinafter, referred to as a subject cloud configuration policy), the parameter value having been selected by the largest number of the other users who have adopted the same cloud configuration policy as their cloud configuration policies, and sets the selected parameter value as the parameter value of <drive> (S601). Note that S601 may be performed when the parameter value of <drive> has not been determined yet for the subject cloud configuration policy (when the parameter value is the default value or blank). In other words, S601 may be skipped when the parameter value of <drive> has been determined for the subject cloud configuration policy.

S62 includes S602 to S607. In S602, the configuration plan providing unit 123 classifies the on-premises pools on the basis of parameter values specified in <drive>, <redundancy>, <encryption>, <compression>, and <deduplication>. In S603, the configuration plan providing unit 123 determines whether a plurality of on-premises pools can be merged into a single cloud pool, and, if yes, whether the capacity of the single cloud pool (e.g., the sum of the capacities of the plurality of on-premises pools) is equal to or less than the parameter value specified in <capacity> in the cloud configuration policy.

If the determination result in S603 is true (S603: Yes), in S604, the configuration plan providing unit 123 determines that the plurality of on-premises pools are to be migrated to a single cloud pool.

If the determination result of S603 is false (S603: No), in S605, the configuration plan providing unit 123 determines whether the on-premises pool is partitioned on the on-premises storage 51S (that is, the on-premises pool may be a single on-premises pool but is intentionally partitioned into a plurality of on-premises pools), and whether the plurality of on-premises pools are allocated to different physical servers.

If the determination result in S605 is true (S605: Yes), in S606, the configuration plan providing unit 123 determines that the plurality of on-premises pools are to be migrated to a plurality of cloud pools. In such a case, each of the on-premises pools corresponds to one cloud pool, in the one-to-one relationship.

If the determination result in S605 is false (S605: No), in S607, the configuration plan providing unit 123 determines the optimal cloud pool allocation pattern (S607 will be described later in detail with reference to FIGS. 7A to 7C).

S63 includes S608 to S614. In S608, the configuration plan providing unit 123 determines whether the parameter value specified in <replication> includes "remote replication" for the subject cloud configuration policy.

If the determination result in S608 is false (S608: No), the configuration plan providing unit 123 determines whether the copy type of the local replication is full copy in S609. The copy type may be identified from the on-premises configuration policy identified in S22 of FIG. 2 (hereinafter, a subject on-premise configuration policy), or from the on-premises information acquired in S21 of FIG. 2. If the determination result in S609 is true (S609: Yes), in S611, the configuration plan providing unit 123 sets the parameter value of <replication> to "single region (single AZ)" for the subject cloud configuration policy. If the determination result in S609 is false (S609: No), in S612, the configuration plan providing unit 123 sets the parameter value of <replication> to "single region (multi-AZ)" for the subject cloud configuration policy.

If the determination result in S608 is true (S608: Yes), in S610, the configuration plan providing unit 123 determines whether the parameter value of <replication> for the subject on-premises configuration policy includes "2DC", that is, whether the replication configuration includes two DCs. If the determination result in S610 is false (S610: No), in S613, the configuration plan providing unit 123 sets the parameter value of <replication> to "multi-region (three or more regions)" for the subject cloud configuration policy. In other words, the volumes in the replication configuration in the cloud storage 51 Care allocated across three or more regions. If the determination result in S610 is true (S610: Yes), in S614, the configuration plan providing unit 123 sets the parameter value of <replication> to "multi-region (two regions)" for the subject cloud configuration policy.

A specific example of S607 will now be described with reference to FIGS. 7A to 7C.

A plurality of on-premises pools are grouped into clusters of on-premises pools having the same parameter values specified in <drive>. The on-premises pools having the same parameter values in <drive> are then further classified into clusters of on-premises pools having the same set of parameter values in <redundancy>, <encryption>, <compression>, and <deduplication>. In the example illustrated in FIG. 7A, there are on-premises pools 71O1 to 7106 having parameter value "SSD" in <drive>. As the clusters of the on-premises pool having the same set of parameter values of <redundancy>, <encryption>, <compression>, and <deduplication>, there are a cluster including the on-premises pools 71O1 to 71O4, a cluster including the on-premises pool 71O5, and a cluster including the on-premises pool 71O6.

For each of the clusters, the configuration plan providing unit 123 assigns a weight to each of the on-premises pools 71O belonging to that cluster. The weight to be assigned depends on the set of parameter values of <encryption>, <compression>, and <deduplication> (e.g., how many of these parameter values are "Yes"). The on-premises pool 71O assigned with a higher weight has a higher input/output load. In other words, the weight given to the on-premises pool 71O represents a relative level of the input/output load to and from the on-premises pool 71O. In the example illustrated in FIG. 7A, the on-premises pool having "Yes" in one of the parameter values of <encryption>, <compression>, and <deduplication> is assigned with a weight of "2"; the on-premises pool having "Yes" in two of the parameter values of <encryption>, <compression>, and <deduplication> is assigned with a weight of "3"; and the on-premises pool having "Yes" in all of the parameter values of <encryption>, <compression>, and <deduplication> is assigned with a weight of "4". Note that different weights may be assigned depending on which parameter item is set with "Yes".

Figure 7A:
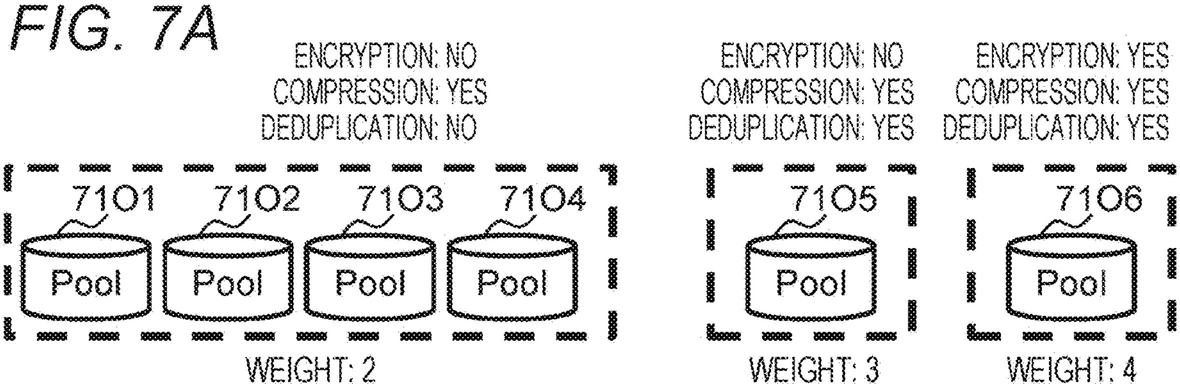
FIG. 7A illustrates an example of a weight given to each set of parameter values.
Figure 7B:
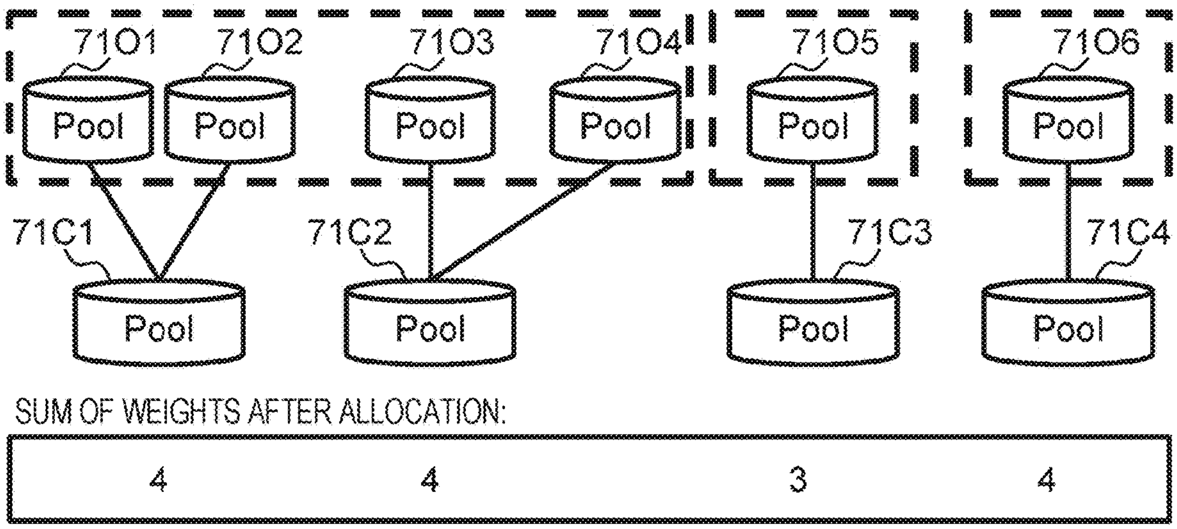
FIG. 7B illustrates an example of variation among weights of cloud pools.
Figure 7C:
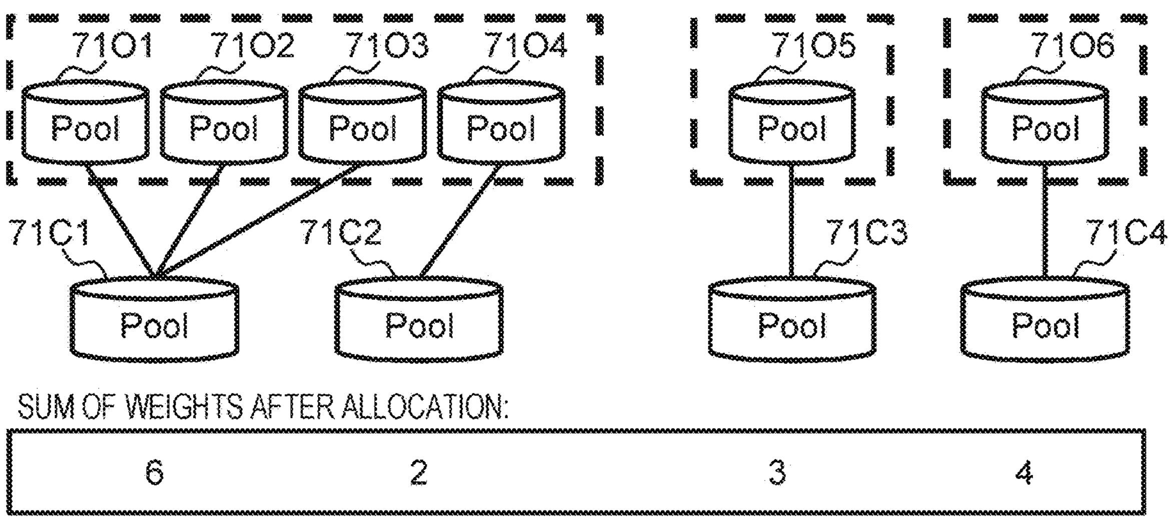
FIG. 7C illustrates another example of variation among the weights of the cloud pools.

The configuration plan providing unit 123 then assigns, for each of the clusters, one or more cloud pools 71C to one or more on-premises pools 71O belonging to the cluster, as illustrated in FIGS. 7B and 7C, as a candidate of a migration target, and calculates a weight for each of such cloud pools 71C. The weight corresponding to each of such cloud pools 71C is calculated as the sum of the weights of the one or more on-premises pools 71O from which the data is to be migrated to that cloud pool 71C. The configuration plan providing unit 123 then determines the allocation of the cloud pools 71C with the least variation in the weights, as the optimal allocation pattern (allocation pattern with uniform weights). In the example illustrated in FIG. 7B, each one of the cloud pools 71C1 to 71C4 has a weight of either "4" or "3"; but in the example illustrated in FIG. 7C, the cloud pool 71C1 has a weight of "6" and the cloud pool 71C2 has a weight of "2", exhibiting large deviations. Therefore, the allocation illustrated in FIG. 7B is determined as the optimum allocation pattern.

Note that the parameter values of <encryption>, <compression>, and <deduplication> are included in the on-premises configuration policy. Such an on-premises configuration policy may be identified for one on-premises storage 51S, or a plurality of on-premises configuration policies may be identified for one on-premises storage (e.g., in this embodiment, one or more on-premises configuration policies are identified for one on-premises storage 51S, and one cloud configuration policy is identified for each of the on-premises configuration policies). In addition, the data on a plurality of on-premises storages 51S may be migrated to one cloud storage 51C, so that a plurality of on-premises configuration policies may be identified for a plurality of on-premises storages 51S. For example, it is possible to identify, for one or more on-premises storages 51S, on-premises configuration policies each including a different combination of parameter values for <encryption>, <compression>, <deduplication>, <redundancy>, <replication>, and <drive>. The data allocation determining processing illustrated in FIG. 6 may then be performed for each of the identified on-premises configuration policies.

Specifically, for example, among the three clusters illustrated in FIG. 7A, the cluster including the largest number of on-premises pools 71O may be the cluster corresponding to the parameter values included in the subject on-premises configuration policy, and the on-premises pools 71O belonging to the other two clusters may be identified from the on-premises information acquired from the on-premises storage 51S.

Alternatively, for example, it is also possible to identify three on-premises configuration policies as the on-premises configuration policy, and the three clusters illustrated in FIG. 7A may correspond to the three on-premises configuration policies, respectively. Furthermore, for example, the on-premises pools 71O belonging to the three clusters may be on one on-premises storage 51S or a plurality of on-premises storages 51S. For example, each cluster may be on a different on-premises storage 51S.

Processing related to a change in the configuration plan will now be described with reference to FIGS. 8 to 11.

Figure 8:
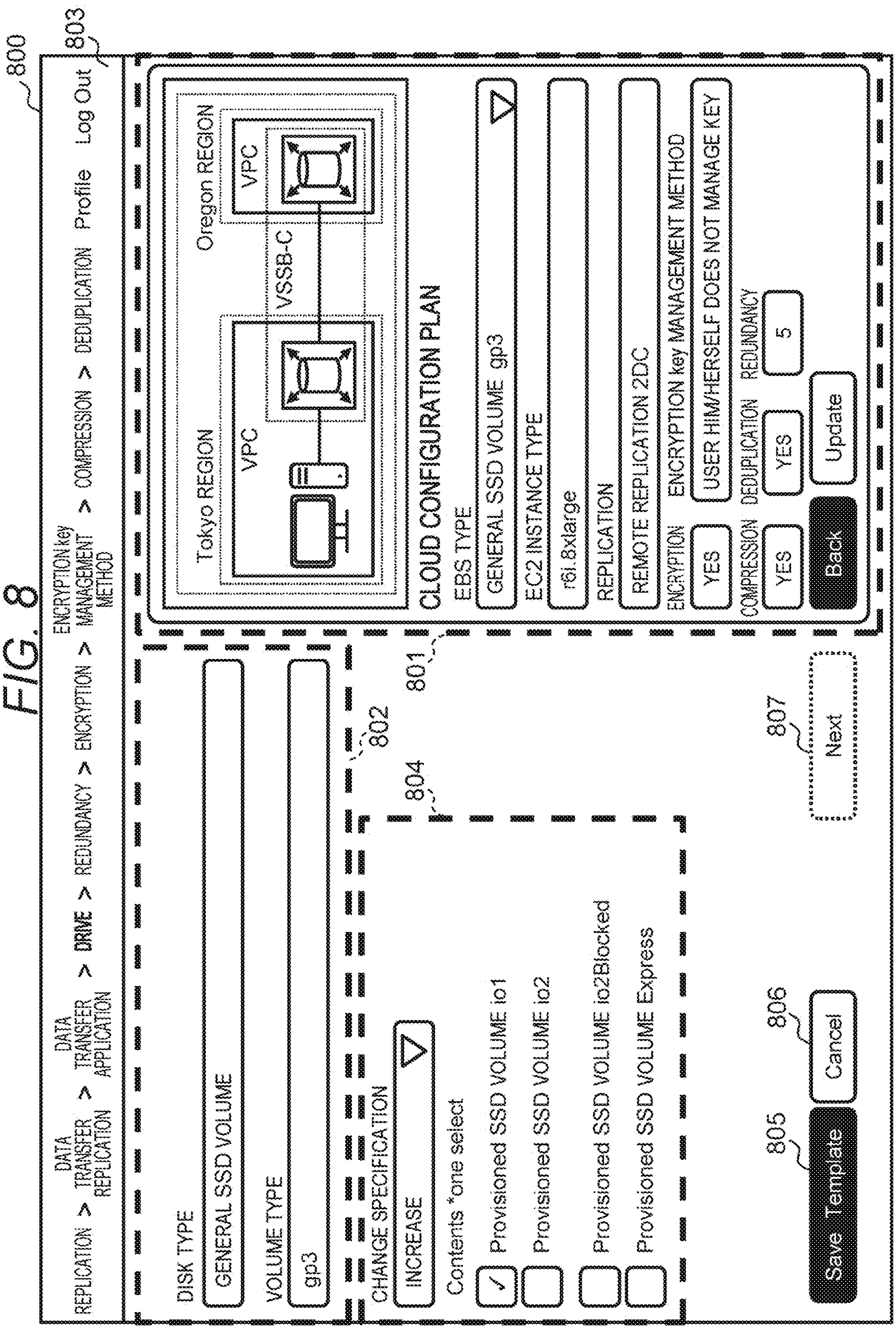
FIG. 8 illustrates an example of a configuration plan changing UI.

FIG. 8 illustrates an example of a configuration plan changing UI.

This configuration plan changing UI 800 is a UI (typically, a GUI) displayed on the management client 105 by the configuration plan providing unit 123. The configuration plan changing UI 800 includes an item order area 803, a configuration plan area 801, a current item area 802, a parameter value receiving area 804, a Save Template button 805, a Cancel button 806, and a Next button 807. The configuration plan providing unit 123 controls to display the configuration plan changing UI 800.

The item order area 803 presents two or more parameter items enabling a change in the parameter values, among the plurality of parameter items related to the configuration policy, in a predetermined order. Specifically, in the item order area 803, labels of the parameter items are arranged in a predetermined order of the parameter items. Among the labels arranged in the item order area 803, the label of the current parameter item (parameter item currently being selected) is highlighted (<drive> in FIG. 8).

In the configuration plan area 801, the latest configuration plan is displayed. The "latest configuration plan" may be either a configuration plan immediately after S25 in FIG. 2 is performed, or a configuration plan reflecting a parameter value changed via the configuration plan changing UI 800. The cloud configuration plan in the configuration plan area 801 includes: a cloud configuration diagram; a parameter value corresponding to an EBS type; and a parameter value corresponding to an EC2 instance type. The EBS type corresponds to the parameter value of <drive>, or a more specific parameter value than the parameter value of <drive>. The parameter value corresponding to the EC2 instance type is a parameter value that is dependent on the parameter value of <data transfer application>. The other parameter values in the configuration plan area 801, that is, the parameter values of <replication>, <encryption>, <encryption key management method>, <compression>, <deduplication>, and <redundancy> correspond to the parameter values in the on-premises configuration policy. The parameter values of all or some of the parameter items related to the on-premises configuration policy may be displayed on the configuration plan changing UI 800, in addition to the parameter values of all or some of the parameter items related to the cloud configuration.

The current item area 802 displays the current parameter value set in the current parameter item. The current parameter item is <drive>, and according to the example illustrated in FIG. 8, a set of <disk type> and <volume type> corresponds to <drive> (EBS type).

The parameter value receiving area 804 displays the parameter values that can be selected for the current parameter item.

The Save Template button 805 is a button pressed to reflect a change in the parameter value to the CF template. The Cancel button 806 is a button pressed to cancel the parameter value. The Next button 807 is a button pressed to move the current parameter item to the next parameter item in the order. Each of the buttons 805 to 807 is enabled (made selectable) or disabled (made unselectable), depending on the progress of the processing.

Figure 9A:
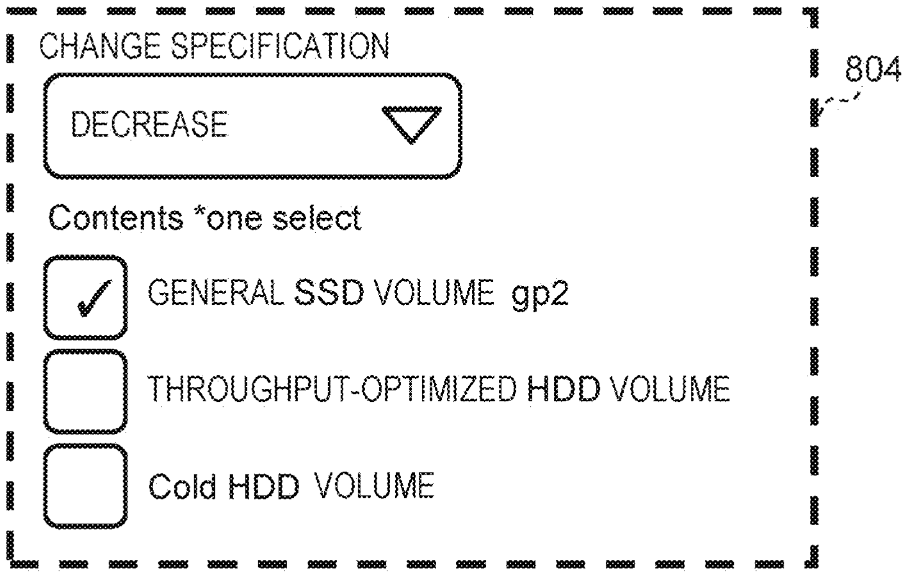
FIG. 9A illustrates an example of a part of the display in the configuration plan changing UI.

A selection for changing (increasing or decreasing) the parameter value or to maintain the parameter value in the configuration plan is received from a user, in the predetermined order of the parameter items. In FIG. 8, the user has designated, in the parameter value receiving area 804, to "increase" the parameter value displayed in the current item area 802. In such a case, the configuration plan providing unit 123 displays, in the parameter value receiving area 804, the parameter values higher in performance than the parameter value displayed in the current item area 802, among a plurality of parameter values corresponding to the current parameter item, in a selectable manner. By contrast, if the user designates, in the parameter value receiving area 804, to "decrease" the parameter value displayed in the current item area 802, as illustrated in FIG. 9A, the configuration plan providing unit 123 displays, in the parameter value receiving area 804, parameter values lower in performance than the parameter value displayed in the current item area 802, among a plurality of parameter values corresponding to the current parameter item, in a selectable manner. That is, the configuration plan providing unit 123 narrows down the parameter values selectable by the user, on the basis of the designation of whether to increase or decrease the current parameter value, and displays the parameter values in a selectable manner.

When one of the parameter values displayed in the parameter value receiving area 804 is selected for the current parameter item, the configuration plan providing unit 123 receives a pressing operation of the Save Template button 805 from the user, and reflects the change in the parameter value (selected parameter value) corresponding to the current parameter item to the CF template. The configuration plan providing unit 123 then automatically (or upon receiving a pressing operation on the Next button 807 from the user) sets the next parameter item in the order as the current parameter item. The request for reflecting the change in the parameter value to the CF template may be received using any method other than pressing the Save Template button 805.

Figure 9B:
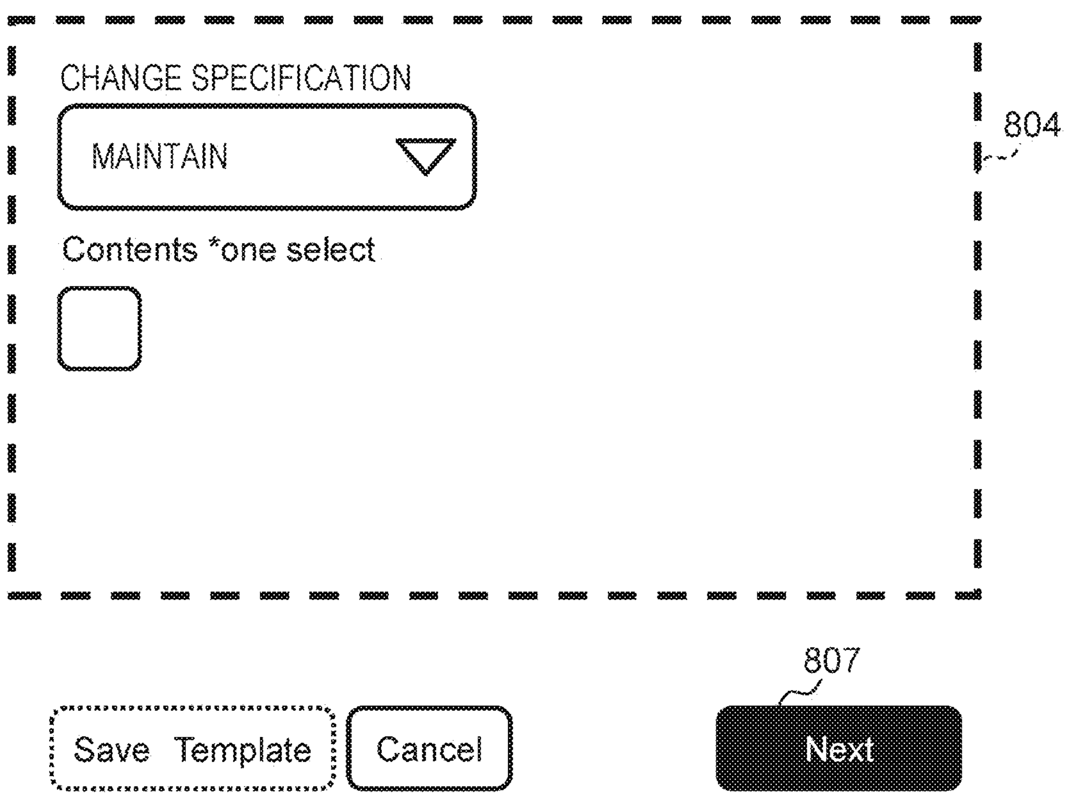
FIG. 9B illustrates another example of a part of the display in the configuration plan changing UI.

As illustrated in FIG. 9B, when a designation to "maintain" is received from the user for the current parameter item, the parameter value displayed in the current item area 802 is retained as the parameter value in the current parameter item. Therefore, the configuration plan providing unit 123 enables the Next button 807 without displaying any parameter values in the parameter value receiving area 804, receives a pressing operation on the Next button 807 from the user, and sets the next parameter item in the order, as the current parameter item. (Alternatively, the next parameter item in the order may be set as the current parameter item without enabling the Next button 807 nor receiving a pressing operation thereon.)

Figure 10A:
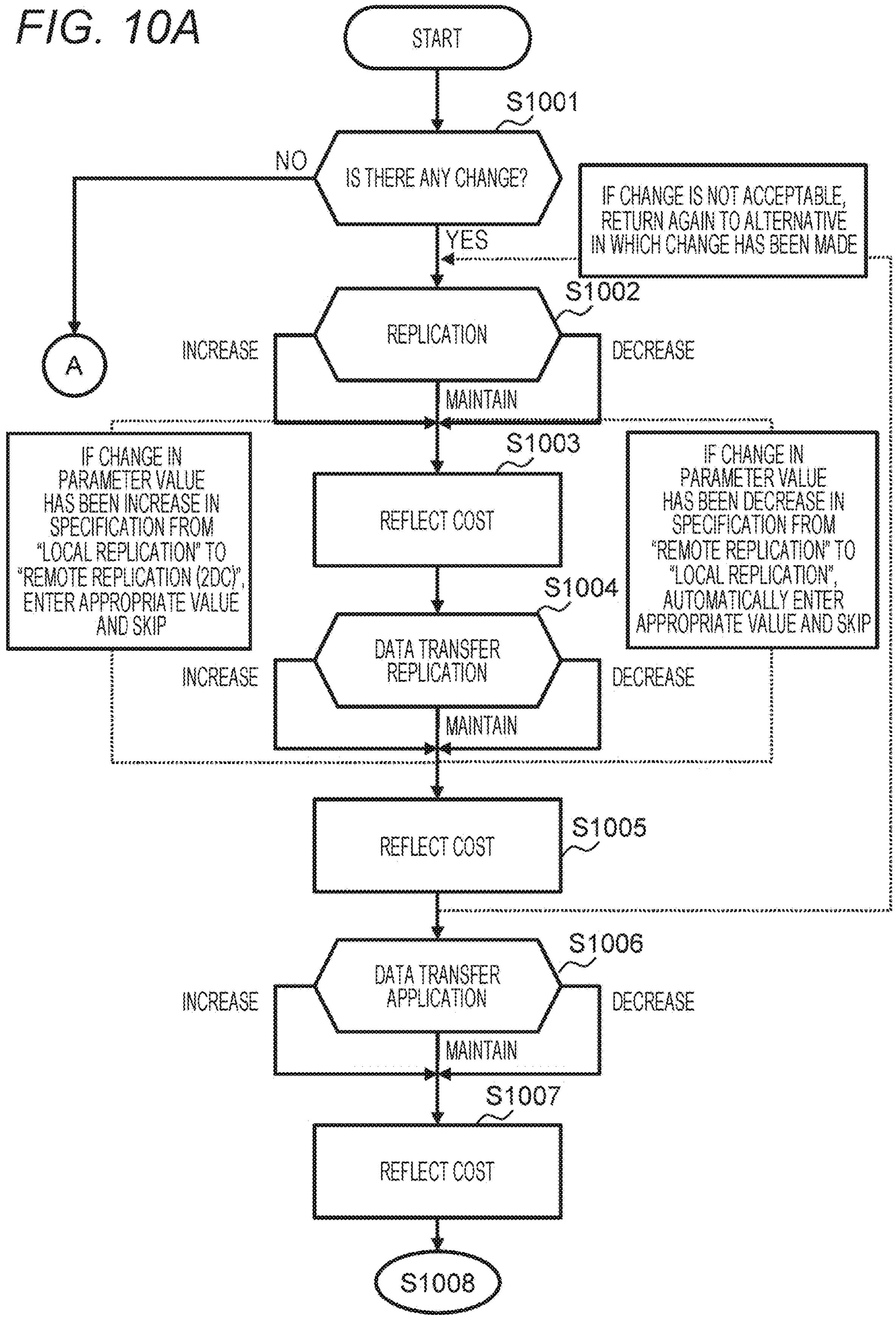
FIG. 10A illustrates a part of the sequence of configuration plan changing processing.
Figure 10B:
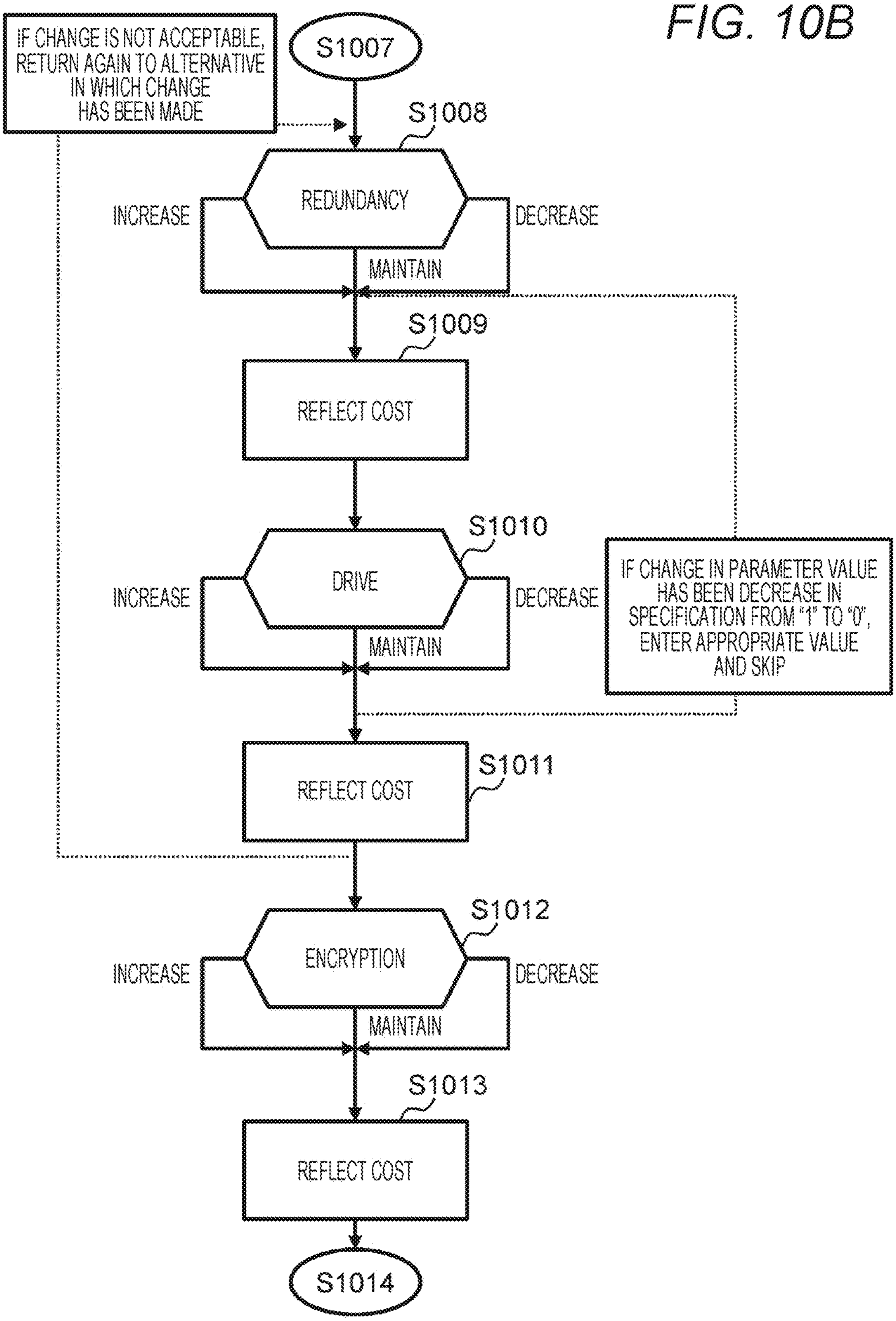
FIG. 10B illustrates another part of the sequence of the configuration plan changing processing.
Figure 10C:
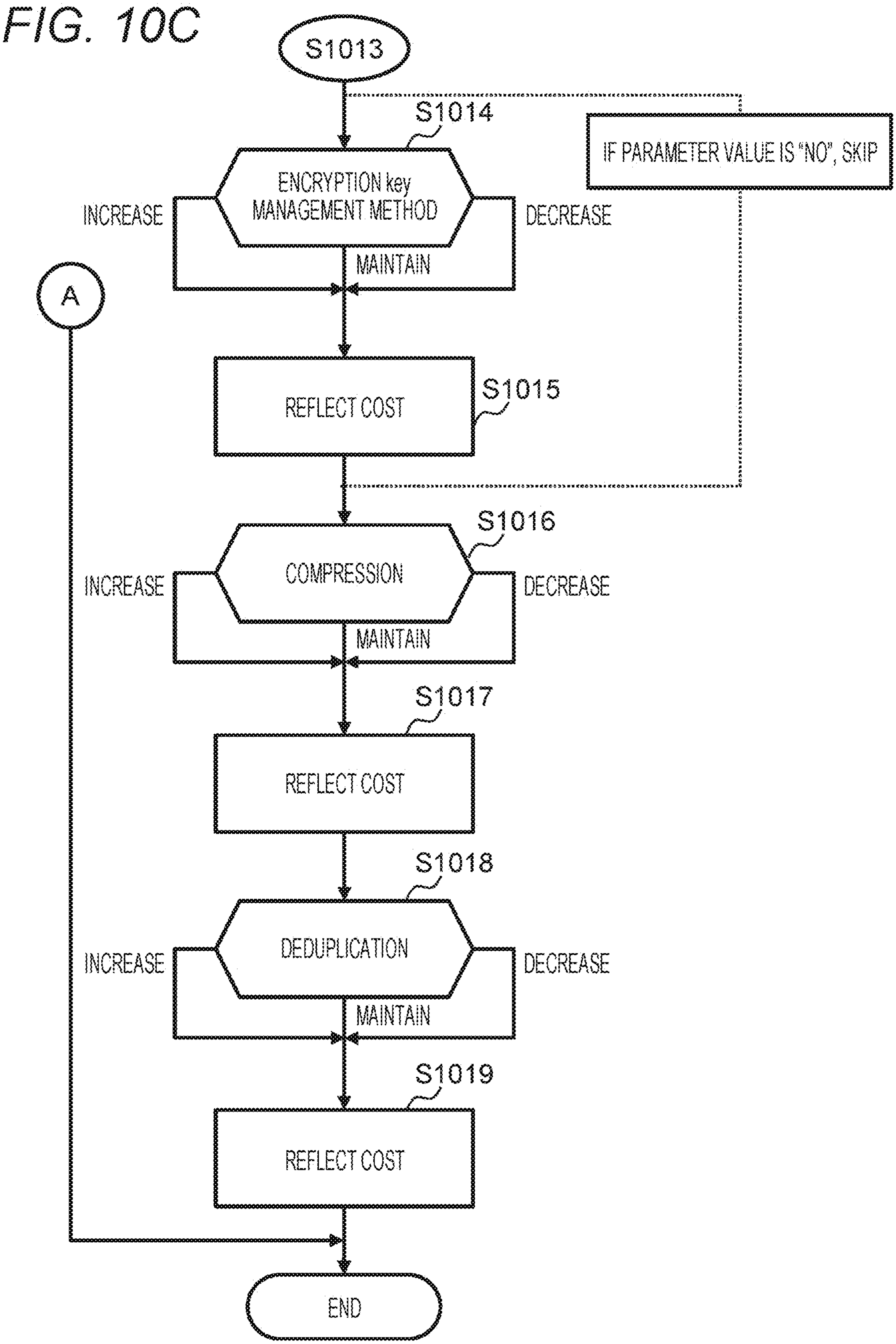
FIG. 10C illustrates the remaining part of the sequence of the configuration plan changing processing.

FIGS. 10A to 10C illustrate the sequence of the configuration plan changing processing.

The configuration plan providing unit 123 displays the configuration plan immediately after S25 in FIG. 2 is performed. If no change is to be made in the configuration plan (S1001: No), the configuration plan changing processing is ended (substantially, the configuration plan changing processing is not performed) because the configuration plan is approved. If a change is to be made in the configuration plan (S1001: Yes), the processing is performed in the order of the parameter items.

Specifically, to begin with, the configuration plan providing unit 123 selects <replication> that is the first item in the order as the current parameter item (S1002), and receives a designation to "increase", to "decrease", or to "maintain" the parameter value for <replication>, from the user. If "increase" or "decrease" is designated, the configuration plan providing unit 123 narrows down and displays the parameter values, and receives a selection of a change in the parameter value. On the basis of this result, the configuration plan providing unit 123 performs cost reflecting processing (S1003). Details of the cost reflecting processing will be described later.

The steps of selecting a current parameter item, receiving a change in the parameter value, and execution of the cost reflecting processing are repeated, in the order of the parameter items. In other words, the configuration plan providing unit 123 sequentially selects <data transfer replication>, <data transfer application>, <redundancy>, <drive>, <encryption>, <encryption key management method>, <compression>, and <deduplication> as the current parameter item as the processing progresses (S1004, S1006, S1008, S1010, S1012, S1014, S1016, S1018), and performs the cost reflecting processing on the basis of a designation (and the selection of the parameter value) by the user, for each of the selected parameter items (S1005, S1007, S1009, S1011, S1013, S1015, S1017, and S1019).

Depending on any one of: the parameter value after the change (or the parameter value maintained) for a certain parameter item; a parameter value of a certain parameter item in the identified on-premises configuration policy; or a parameter value after the change or a parameter value maintained for the certain parameter item, the configuration plan providing unit 123 determines a unique parameter value for a parameter item subsequent to the certain parameter item in the order, skips receiving a selection of a parameter value for the parameter item that is subsequent to the certain parameter item in the order. Specific examples are illustrated in FIGS. 10A to 10C. That is, there are first to fourth examples.

In the first example, the specification of replication is changed from the value "local replication" to "remote replication (2DC)" in S1002. In other words, although the original value has not required a selection of a value in S1004 and thus S1004 has been skipped, the behavior of skipping changes; in other words, as the value of data transfer replication, which has been originally "None", "VPC Peering" is automatically input instead, before skipping S1004. Note that, if such a change is not acceptable for the user (e.g., if the user cannot accept the cost resulting from the automatically input value), the value may be returned to the value of the option where the change is made.

In the second example, the specification of replication is changed from the value "remote replication" to "local replication" in S1002. For this reason, the configuration of data transfer replication, which has been originally enabled to change in S1004, no longer requires a selection. As the value of data transfer replication, which has been originally "VPC Peering", "None" is automatically input, and then S1004 is skipped. Note that, if such a change is not acceptable for the user (e.g., if the user cannot accept the cost resulting from the automatically input value), the value may be returned to the value of the option where the change is made.

In the third example, the specification of redundancy is changed from the value of "1" to "0" in S1008. The value of drive, which has been enabled to change in S1010, is now uniquely determined as "Provisioned IOPS SSD". Therefore, the original drive value "Throughput Optimized HDD Volume" is automatically changed to "Provisioned IOPS SSD", and S1010 is skipped. Note that, if such a change is not acceptable for the user (e.g., if the user cannot accept the cost resulting from the automatically input value), the value may be returned to the value of the option where the change is made.

In the fourth example, if the parameter value of <encryption> in the on-premises configuration policy is "None", the encryption key management is not necessary. Therefore, the parameter value of <encryption key management method> in the cloud configuration is set to "None", and S1014 and S1015 are skipped.

Each of the first to fourth examples is an example in which a step is skipped because the parameter value of a certain parameter item in the on-premises configuration policy satisfies a predetermined condition. However, it is also possible to skip a user operation for a parameter item subsequent to the certain parameter item in the order, when a parameter value changed (or a parameter value maintained) for a certain parameter item in the cloud configuration satisfies a predetermined condition. A specific example is described by comparing FIGS. 3B and 12. The frames in thick lines in FIG. 12 indicate parameter values manually changed from those illustrated in FIG. 3B, and the frames in broken lines in FIG. 12 indicate parameter values automatically changed from those illustrated in FIG. 3B in accordance with the manually changed parameter values. For example, regarding the cloud configuration policy C1, when the parameter value of the <replication> is manually changed from "single region (single AZ or multi-AZ)" to "multi-region (two regions)", the parameter value of the <data transfer replication> may be automatically changed from "None" to "VPC peering (single VPC connection)".

Figure 11:
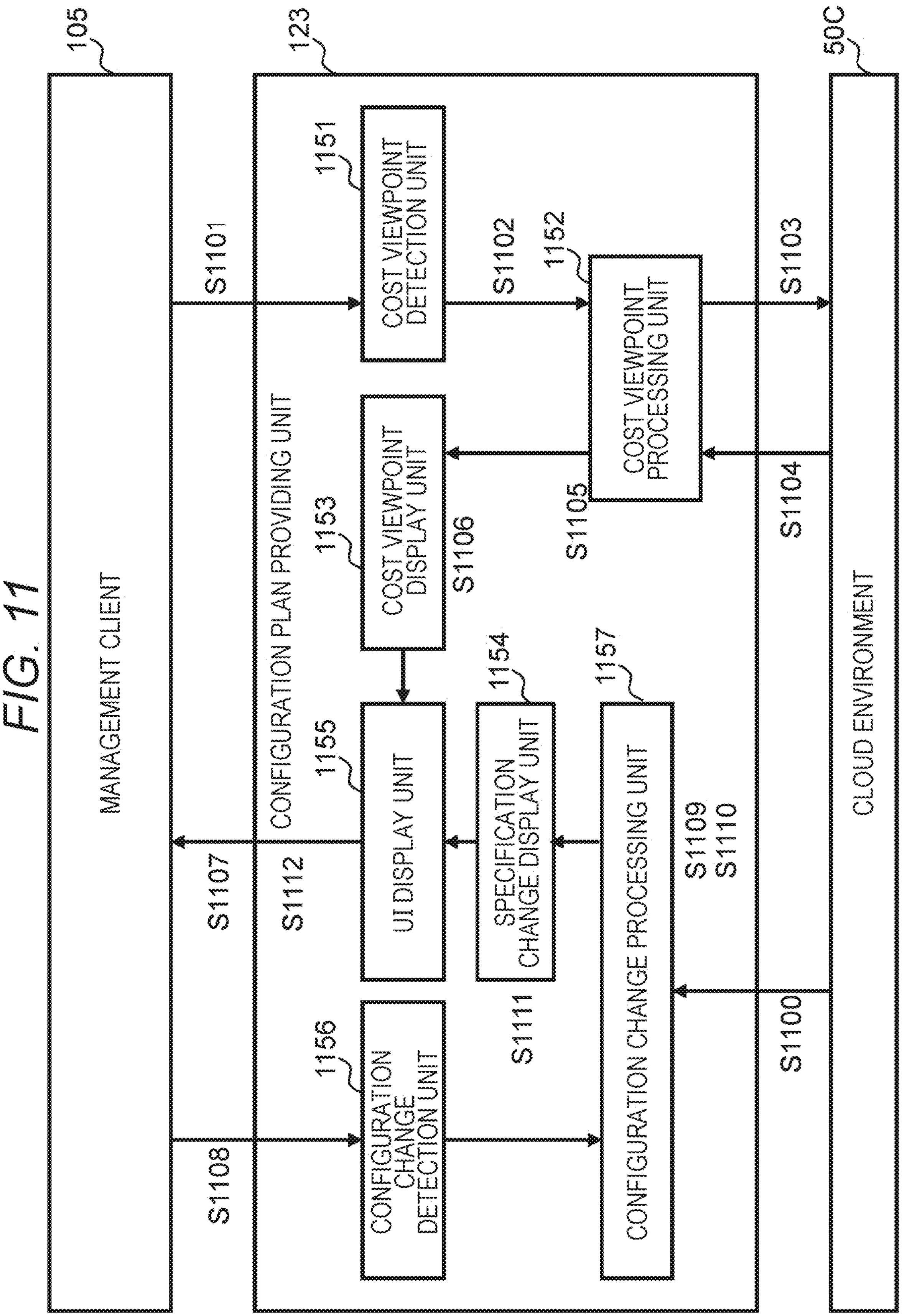
FIG. 11 schematically illustrates a configuration plan changing processing including cost reflecting processing.

FIG. 11 schematically illustrates the configuration plan changing processing including the cost reflecting processing.

The configuration plan providing unit 123 includes, as functions related to the cost reflecting processing, for example, a configuration change processing unit 1157, a cost viewpoint detecting unit 1151, a cost viewpoint processing unit 1152, a cost viewpoint displaying unit 1153, a specification change displaying unit 1154, a UI displaying unit 1155, and a configuration change detecting unit 1156. In the process of changing a configuration plan, the configuration plan providing unit 123 calculates the cost increase or decrease in accordance with the change of the parameter value, and displays the cost increase or decrease on the management client 105 every time the cost reflecting processing is performed (or at the end of the configuration plan changing processing). The change in the parameter value (or a change in the configuration plan) may be reflected to the CF template upon receiving an approval for the displayed cost increase or decrease from the user.

The configuration change processing unit 1157 acquires a CF template (e.g., the CF template in the storage area for the management server 100 in the cloud environment 50C) from the cloud environment 50C (S1000). In the configuration plan changing processing, the cost reflecting processing is performed as illustrated in FIG. 11.

That is, when a parameter value is changed by the user and the change matches any pattern of cost change, the cost viewpoint detecting unit 1151 detects that the change in the parameter value matches the cost change pattern (S1101). For example, as a cost change pattern, a parameter value after the change is defined, for each of <drive>, <replication>, <data transfer application>, and <encryption key management method>.

The cost viewpoint processing unit 1152 identifies the matching cost change pattern (S1102), and issues a cost inquiry to the cloud environment 50C using parameter values in accordance with the identified cost change pattern (e.g., parameter values before and after the change) as a key (S1103). In response to the inquiry, the cost viewpoint processing unit 1152 receives cost information from the cloud environment 50C (S1104). The cost information may be information including information specifying costs corresponding to the parameter values before and after the change. The cost viewpoint processing unit 1152 calculates a cost increase or decrease on the basis of the cost information (S1105).

The cost viewpoint displaying unit 1153 creates a dialog asking as to whether to approve the calculated cost increase or decrease (S1106), and the UI displaying unit 1155 displays the dialog on the management client 105 (S1107). When the configuration change detecting unit 1156 receives the approval from the user on the dialog (S1108), the configuration change processing unit 1157 reflects the approved change in the parameter value to the CF template (S1109), and selects the next parameter item (S1110). The specification change displaying unit 1154 identifies, for the next parameter item selected in S1110, the parameter values to be displayed in the current item area 802 and the parameter value receiving area 804 in the configuration plan changing UI 800, and generates a changed configuration plan for the configuration plan area 801 (S1111). The UI displaying unit 1155 then displays the parameter values thus identified, and the changed configuration plan generated in S1111, in the configuration plan changing UI 800 (S1112). S1101 may then be performed for the next parameter item.

Although one embodiment has been described above, such an embodiment is provided as one example for describing the present invention, and is not intended to limit the scope of the present invention only to the embodiment. The present invention may be carried out in various other forms.

The description above can be summarized as follows, for example. The following summary may include some supplementary descriptions for the above, and descriptions of modifications.

The management server 100 (an example of a management system) includes the on-premises policy identifying unit 121, the cloud policy identifying unit 122, and the configuration plan providing unit 123. The on-premises policy identifying unit 121 acquires on-premises information (information including configuration information specifying an on-premises configuration that is a configuration of the on-premises storage 51S), and identifies an on-premises configuration policy corresponding to the on-premises configuration identified in the on-premises information from the on-premises policy management table 111 (an example of on-premises policy management information). The cloud policy identifying unit 122 identifies the cloud configuration policy corresponding to the identified on-premises configuration policy from the cloud policy management table 112 (an example of cloud policy management information) that represents cloud configuration policies each mapped to an on-premises configuration policy in one-to-one relationship. The configuration plan providing unit 123 provides a user with a configuration plan including a cloud configuration plan that is a configuration of the cloud storage 51C, and that is in accordance with the identified cloud configuration policy. With this, the user can receive an appropriate configuration plan for a cloud configuration that is a migration target of the on-premises configuration, without the need for grasping the details of various parameter items of either the on-premises configuration or the cloud configuration.

The configuration plan providing unit 123 may narrow down one from a plurality of patterns for allocating a plurality of on-premises pools to one or more of cloud pools 71C (an example of one or more cloud logical stores) that are migration targets, in accordance with parameter values in one or a plurality of allocation parameter items related to the plurality of on-premises pools 71O (an example of a plurality of on-premises logical stores). With this, the user is not required to consider the allocation of data on the migration target, at the time of migration.

Each of "one or a plurality of allocation parameter items" is a parameter item defined as a parameter item affecting the allocation of the cloud pools, and the plurality of allocation parameter items may include two or more allocation parameter items that include at least (e), among the following (a) to (e). Because a plurality of pools 71 sharing the common parameter values for such parameter items can be merged to one pool 71, it is possible to determine the data allocation pattern by using these parameter items as the allocation parameter items.

(a) Encryption (a parameter item related to the encryption of data to be stored in a pool);

(b) Compression (a parameter item related to the compression of data to be stored in a pool);

(c) Deduplication (a parameter item related to the deduplication of data to be stored in a pool);

(d) Redundancy (a parameter item related to the redundancy of data to be stored in a pool); and (e) Drive (a parameter item related to the type of a persistent storage device (an example of a physical store) providing a foundation of the pool).

When a plurality of on-premises pools 71O share the same parameter values in two or more of such allocation parameter items, and the total capacity of the plurality of on-premises pools 71O is equal to or less than the parameter value of <capacity> (an example of a predetermined capacity) (e.g., S603: Yes), the configuration plan providing unit 123 may determine to use one cloud pool 71C as the migration target of the plurality of on-premises pools 71O (e.g., S604). With this, the number of pools in the migration target is reduced appropriately, and as a result, the burden for managing the migration target can be reduced, advantageously.

If the plurality of on-premises pools 71O have different allocation parameter values in two or more allocation parameter items, or if the plurality of on-premises pools 71O have matching parameter values in two or more allocation parameter items but are on a single physical server in the on-premises storage (e.g., S605: No), the configuration plan providing unit 123 may determine an allocation pattern resulting in the least variation in the weights of the cloud pools 71C, as the optimal allocation (e.g., S607). As a result, the I/O load in the migration target can be distributed, advantageously. Note that, as described above, each of the plurality of cloud pools 71C may be a migration target of one or more of the on-premises pools 71O having the same parameter values in two or more allocation parameter items, and the weight may be given to the cloud pool 71C on the basis of the weight of the one or more of the on-premises pools 71O to be migrated to that cloud pool 71C (e.g., the sum of the weights of the one or more of on-premises pools 71O). Each of the one or more on-premises pools 71O may be given a weight based on the parameter values of the two or more allocation parameter items (e.g., a higher weight may be given for a higher I/O load).

If the plurality of on-premises pools 71O have matching parameter values in two or more allocation parameter items but each of the on-premises pools 71O exists independently, and the plurality of on-premises pools 71O are on two or more physical servers in the on-premises storage (e.g., S605: Yes), the configuration plan providing unit 123 may prepare one cloud pool 71C as a migration target for each of the plurality of on-premises pools 71O, and determine an allocation pattern that is the same as the allocation pattern of the plurality of on-premises pools 71O as the allocation pattern of the plurality of cloud pools 71C (e.g., S606). As a result, when there is a possibility that the allocation of the plurality of on-premises pools 71O on the migration source is intentional, for example, the same allocation can be maintained in the migration target.

The plurality of allocation parameter items may include, in addition to the two or more allocation parameter items, <replication> that is a parameter item related to replication between pools. Depending on a replication configuration specified in the parameter value of <replication> for a plurality of on-premises pools 71O, the configuration plan providing unit 123 may determine a region configuration including whether the plurality of cloud pools 71C are to be allocated to a single region or multiple regions. In this manner, a data allocation more suitable for the migration source can be implemented in the migration target, advantageously. Note that when the parameter value of <replication> includes "local replication", the copy type specified in the local replication may determine whether the single region includes a single availability zone or multiple availability zones in the region configuration. When the parameter value of <replication> includes "remote replication", the number of data centers (an example of physical servers) implementing the remote replication may determine the number of regions of the multi-region in the region configuration.

An order of parameter items may be predetermined for two or more parameter items enabling a change in the parameter values, among a plurality of parameter items related to a configuration policy. In the process of changing the configuration plan provided to a user, the configuration plan providing unit 123 may receive a change or a designation to maintain a parameter value from the user, in the predetermined order of the parameter items. Depending on the parameter value specified in a certain parameter item (or depending on the parameter value having been changed or maintained for the certain parameter item) included in the identified on-premises configuration policy, the configuration plan providing unit 123 may uniquely determine a parameter value for any of the parameter items subsequent to the certain parameter item in the predetermined order, and skip receiving a parameter value for the parameter item. In this manner, users can customize the provided configuration plan, and a cloud configuration with a higher degree of satisfaction can be implemented. Furthermore, operations are skipped as appropriate, so that the burden of the user can be reduced, advantageously.

In the process of changing the provided configuration plan, when a received change in the parameter value finds a match with any cost change pattern, the configuration plan providing unit 123 may calculate a cost increase or decrease corresponding to the matching cost change pattern. The configuration plan providing unit 123 may provide the cost increase or decrease to the user every time the parameter value is changed (or when the update or maintenance of the parameter value has been completed for all of the two or more parameter items). With this, the user can customize the cloud configuration from the viewpoint of the cost.

The management server 100 may include a configuration constructing unit 124. When an approval of the configuration plan is received from the user, the configuration constructing unit 124 may generate a constructing instruction for constructing a cloud storage 51C having a cloud configuration in accordance with the configuration plan, on the basis of the configuration plan, and output the instruction to the computer system (e.g., the cloud environment 50C) configured to construct the cloud storage 51C. As a result, the cloud storage 51C having the cloud configuration in accordance with the configuration plan can be deployed in the cloud environment 50C. Note that the constructing instruction may include a template such as a CF template (data including parameter values for parameter items that are required for constructing the cloud storage 51C).

What is claimed is:

1. A management system comprising:

a processor; and a memory, coupled to the processor, storing instructions that when executed by the processor, configure the processor to:

acquire on-premises information including configuration information specifying an on-premises configuration that is a configuration of an on-premises storage, identify an on-premises configuration policy corresponding to the on-premises configuration specified in the on-premises information, from on-premises policy management information specifying a plurality of on-premises configuration policies, identify a cloud configuration policy corresponding to the identified on-premises configuration policy, from cloud policy management information specifying a plurality of cloud configuration policies each of which is mapped to an on-premises configuration policy in a one-to-one relationship, and provide a user with a configuration plan including a cloud configuration plan that is a configuration of a cloud storage and that is a configuration in accordance with the identified cloud configuration policy, wherein each of the plurality of on-premises configuration policies is a configuration policy in which an on-premises parameter value is defined for each of a plurality of parameter items, wherein each of the plurality of cloud configuration policies is a configuration policy in which a cloud parameter value is defined for each of the plurality of parameter items, wherein the processor is configured to narrow down one pattern from a plurality of patterns for allocating a plurality of on-premises logical stores to one or more cloud logical stores that are migration targets, in accordance with a parameter value of one or a plurality of allocation parameter items related to the plurality of on-premises logical stores, wherein the plurality of allocation parameter items include two or more allocation parameter items that include at least (e) of following (a) to (e):

(a) a parameter item related to encryption of data stored in a logical store;

(b) a parameter item related to compression of data stored in a logical store;

(c) a parameter item related to deduplication of data stored in a logical store;

(d) a parameter item related to redundancy of data stored in a logical store; and (e) a parameter item related to a type of a physical store on which a logical store is based, and wherein, upon determining the plurality of on-premises logical stores have matching parameter values in the two or more allocation parameter items, and a total capacity of the plurality of on-premises logical stores is equal to or less than a predetermined capacity specified in the identified cloud configuration policy, the processor determines that the plurality of on-premises logical stores is to be migrated to a single cloud logical store.

2. The management system according to claim 1, wherein each of the one or a plurality of allocation parameter items is a parameter item defined as a parameter item affecting allocation to a cloud logical store, wherein each of the plurality of on-premises logical stores is a logical store on an on-premises storage, and wherein each of the one or more cloud logical stores is a logical store on a cloud storage.

3. The management system according to claim 1, wherein when parameter values for the plurality of on-premises logical stores have different parameter values for each of the two or more allocation parameter items, or when the plurality of on-premises logical stores have matching parameter values for each of the two or more allocation parameter items but the plurality of on-premises logical stores are on a single physical server in the on-premises storage, the processor determines an allocation pattern having least variation among weights of the cloud logical stores, as an optimal allocation pattern, wherein each of the plurality of cloud logical stores is a cloud logical store for migrating the one or more on-premises logical stores having matching parameter values in the two or more allocation parameter items, and is assigned with a weight that is based on a weight of the one or more on-premises logical stores that are to be migrated to the cloud logical store, and wherein each of the one or more on-premises logical stores has a weight in accordance with the parameter values of the two or more allocation parameter items.

4. The management system according to claim 1, wherein, when the plurality of on-premises logical stores have matching parameter values in the two or more allocation parameter items but each the plurality of on-premises logical stores exists independently, and the plurality of on-premises logical stores are on two or more physical servers in the on-premises storage, the processor prepares a cloud logical store as a migration target of each of the plurality of on-premises logical stores, and uses a same allocation pattern as an allocation pattern for the plurality of on-premises logical stores, as an allocation pattern for the plurality of cloud logical stores.

5. The management system according to claim 1, wherein the plurality of allocation parameter items include a replication item that is a parameter item related to replication between logical stores, in addition to the two or more allocation parameter items, wherein the processor determines a region configuration including whether the plurality of cloud logical stores are to be allocated to a single region or multiple regions, in accordance with the replication configuration specified in a parameter value of the replication item, for the plurality of on-premises logical stores, and wherein a region is a location where a physical server serving as a foundation of the cloud storage is in operation.

6. The management system according to claim 5, wherein when the replication configuration specified in the parameter value of the replication item is local replication, a copy type in the local replication determines as to whether there is one availability zone or a plurality of availability zones each of which is an independent resource group in a single region, as the region configuration, and wherein when the replication configuration specified in the parameter value of the replication item is remote replication, number of physical servers implementing the remote replication determines number of regions constituting a multi-region, as the region configuration.

7. The management system according to claim 1, wherein an order of parameter items is predetermined for two or more parameter items enabling a change in parameter values, among the plurality of parameter items, wherein the processor changes the provided configuration plan, and wherein in a process of changing the provided configuration plan, the processor is:

configured to receive a change in or a designation to maintain a parameter value in the provided configuration plan from a user, in the predetermined order of the parameter items; and configured, depending on a parameter value in a certain parameter item in the identified on-premises configuration policy, or depending on a parameter value after a change or a designation to maintain the parameter value in the certain parameter item, to uniquely determine a parameter value for a parameter item subsequent to the certain parameter item in the predetermined order, and to skip receiving a parameter value for the parameter item subsequent to the certain parameter item in the predetermined order.

8. The management system according to claim 7, wherein in the process of changing the provided configuration plan, when a change in the parameter value finds a match with any cost change pattern, the processor calculates a cost increase or decrease corresponding to the cost change pattern having matched, and wherein the processor provides the cost increase or decrease to the user every time a parameter value is changed, or when update or maintenance of parameter values of all of the two or more parameter items is completed.

9. The management system according to claim 1, wherein the processor is configured to, when an approval of the configuration plan is received from the user, generate a constructing instruction for constructing a cloud storage having a cloud configuration that is in accordance with the configuration plan, based on the configuration plan, and to output the constructing instruction to a computer system configured to construct the cloud storage.

10. A management method comprising causing a computer to execute steps comprising:

acquiring on-premises information including configuration information specifying an on-premises configuration that is a configuration of an on-premises storage, and to identify an on-premises configuration policy corresponding to the on-premises configuration specified in the on-premises information, from on-premises policy management information specifying a plurality of on-premises configuration policies;

identifying a cloud configuration policy corresponding to the identified on-premises configuration policy, from cloud policy management information specifying a plurality of cloud configuration policies each of which is mapped to an on-premises configuration policy in a one-to-one relationship; and providing a user with a configuration plan including a cloud configuration plan of a cloud storage and that is a configuration in accordance with the identified cloud configuration policy, wherein each of the plurality of on-premises configuration policies is a configuration policy in which an on-premises parameter value is defined for each of a plurality of parameter items, wherein each of the plurality of cloud configuration policies is a configuration policy in which a cloud parameter value is defined for each of the plurality of parameter items, wherein the method further comprises narrowing down one pattern from a plurality of patterns for allocating a plurality of on-premises logical stores to one or more cloud logical stores that are migration targets, in accordance with a parameter value of one or a plurality of allocation parameter items related to the plurality of on-premises logical stores, wherein the plurality of allocation parameter items include two or more allocation parameter items that include at least (e) of following (a) to (e):

(a) a parameter item related to encryption of data stored in a logical store;

(b) a parameter item related to compression of data stored in a logical store;

(c) a parameter item related to deduplication of data stored in a logical store;

(d) a parameter item related to redundancy of data stored in a logical store; and (e) a parameter item related to a type of a physical store on which a logical store is based, and wherein, the method further comprises: upon determining the plurality of on-premises logical stores have matching parameter values in the two or more allocation parameter items, and a total capacity of the plurality of on-premises logical stores is equal to or less than a predetermined capacity specified in the identified cloud configuration policy, determining that the plurality of on-premises logical stores is to be migrated to a single cloud logical store.

* * * * *